United States Patent
Bondurant et al.

(10) Patent No.: US 12,306,630 B2
(45) Date of Patent: *May 20, 2025

(54) INDOOR POSITIONING AND NAVIGATION SYSTEMS AND METHODS

(71) Applicant: QUEST INTEGRITY USA, LLC, Stafford, TX (US)

(72) Inventors: Phillip D. Bondurant, Kent, WA (US); Giovanni Nino, Kent, WA (US)

(73) Assignee: Quest Integrity USA, LLC, Stafford, TX (US)

( * ) Notice: Subject to any disclaimer, the term of this patent is extended or adjusted under 35 U.S.C. 154(b) by 64 days.

This patent is subject to a terminal disclaimer.

(21) Appl. No.: 18/349,889

(22) Filed: Jul. 10, 2023

(65) Prior Publication Data
US 2023/0359206 A1 Nov. 9, 2023

Related U.S. Application Data

(63) Continuation of application No. 17/246,973, filed on May 3, 2021, now Pat. No. 11,747,810, which is a
(Continued)

(51) Int. Cl.
G05D 1/00 (2024.01)
G01B 5/18 (2006.01)
G01B 17/02 (2006.01)

(52) U.S. Cl.
CPC ............. *G05D 1/0094* (2013.01); *G01B 5/18* (2013.01); *G01B 17/02* (2013.01); *G05D 1/024* (2013.01);
(Continued)

(58) Field of Classification Search
CPC .... G05D 1/0094; G05D 1/024; G05D 1/0255; G05D 1/027; G05D 1/048;
(Continued)

(56) References Cited

U.S. PATENT DOCUMENTS

| | | |
|---|---|---|
| 5,867,800 A | 2/1999 | Leif |
| 6,104,970 A | 8/2000 | Schmidt, Jr. et al. |

(Continued)

FOREIGN PATENT DOCUMENTS

| | | |
|---|---|---|
| EP | 3942270 A1 | 1/2022 |
| WO | 2016073244 A1 | 5/2016 |

(Continued)

OTHER PUBLICATIONS

European Examination Report mailed Dec. 20, 2023, issued in related European Application No. 20773629.9 filed Mar. 19, 2020, 5 pages.
(Continued)

*Primary Examiner* — Bao Long T Nguyen
(74) *Attorney, Agent, or Firm* — Christensen O'Connor Johnson Kindness PLLC

(57) ABSTRACT

Indoors positioning and navigation systems and methods are described herein. In one embodiment, a system for inspecting or maintaining a storage tank includes a vehicle having: at least one sensor for determining properties of a storage tank and a navigation system. The navigation system includes an acoustic transmitter carried by the vehicle and an inertial measurement unit (IMU) sensor configured to at least partially determine a location of the vehicle with respect to the storage tank. The vehicle also includes a propulsion unit configured to move the vehicle within the storage tank, and an acoustic receiver fixed with respect to the storage tank. The vehicle moves inside the storage tank in concentric arcs with respect to the acoustic receiver.

30 Claims, 29 Drawing Sheets

Related U.S. Application Data continuation of application No. 16/964,565, filed as application No. PCT/US2020/023541 on Mar. 19, 2020, now Pat. No. 10,996,674.

(60) Provisional application No. 62/823,780, filed on Mar. 26, 2019, provisional application No. 62/820,454, filed on Mar. 19, 2019.

(52) U.S. Cl.
CPC ........... G05D 1/0255 (2013.01); G05D 1/027 (2013.01); G05D 1/048 (2013.01)

(58) Field of Classification Search
CPC .... G05D 2201/0207; G05D 1/10; G05D 1/02; G01B 5/18; G01B 17/02; G01M 5/0033; G01M 5/0066; G01M 5/0091; G01M 3/24; G01M 3/04; G01S 15/06; G01S 15/86; G01S 15/88; G01S 15/02; G01N 29/24

See application file for complete search history.

(56) References Cited

U.S. PATENT DOCUMENTS

| | | | |
|---|---|---|---|
| 6,216,058 B1 | 4/2001 | Hosek et al. | |
| 6,317,387 B1 | 11/2001 | D'Amaddio et al. | |
| 8,116,928 B2 | 2/2012 | Wu et al. | |
| 10,488,294 B2 | 11/2019 | Walker et al. | |
| 10,996,674 B2 * | 5/2021 | Bondurant | G05D 1/10 |
| 11,747,810 B2 * | 9/2023 | Bondurant | G01S 15/86 |
| | | | 701/2 |
| 2016/0299031 A1 | 10/2016 | Walker et al. | |
| 2018/0284470 A1 | 10/2018 | Yamamoto et al. | |
| 2020/0109949 A1 | 4/2020 | Vaganay et al. | |

FOREIGN PATENT DOCUMENTS

| | | |
|---|---|---|
| WO | 2017099116 A1 | 6/2017 |
| WO | 2019005939 A1 | 1/2019 |
| WO | 2020191146 A1 | 9/2020 |

OTHER PUBLICATIONS

International Search Report and Written Opinion, mailed Jun. 9, 2020, issued in corresponding International Application No. PCT/US2020/023541, filed Mar. 19, 2020, 9 pages.

Extended European Search Report mailed Nov. 17, 2022, issued in corresponding European Application No. 20773629, filed Mar. 19, 2020, 11 pages.

Examination Search Report mailed Nov. 1, 2023, issued in corresponding Candian Application No. 3131004, filed Mar. 19, 2020, 3 pages.

* cited by examiner

ROV inside a tank

Sonar reflection from tank walls

Circle fitting and tank center calculation

Circle with possible ROV positions around tank center and local heading reference Circle with only two possible ROV positions
from local heading reference Unique ROV position based on
ROV angle to the Reference

INDOOR POSITIONING AND NAVIGATION SYSTEMS AND METHODS

CROSS-REFERENCE(S) TO RELATED APPLICATION(S)

This application is a continuation of U.S. Non-Provisional patent application Ser. No. 17/246,973, filed May 3, 2021, which is a continuation of U.S. Non-Provisional patent application Ser. No. 16/964,565, filed Jul. 23, 2020, now U.S. Pat. No. 10,996,674, issued May 4, 2021 which is a national phase application under Sec. 371 of International Application No. PCT/US2020/023541, filed on Mar. 19, 2020, which claims priority to U.S. Provisional Patent Application No. 62/820,454, filed Mar. 19, 2019 and U.S. Provisional Patent Application No. 62/823,780, filed Mar. 26, 2019. Each of the disclosures of said applications are incorporated by reference herein in their entirety.

BACKGROUND

Storage tanks are containers that hold large volumes of liquids or mediums used for the short- or long-term storage of heat or cold. Storage tanks form a familiar part of petroleum refineries, chemical plants, storage farms, airports, harbors, and manufacturing facilities. These tanks operate under no (or very little) pressure, distinguishing them from pressure vessels that store compressed gases. Storage tanks are often cylindrical in shape, perpendicular to the ground with flat bottoms, and a fixed or floating roof. A typical storage tank farm illustrating several storage tanks 1 is shown in FIG. 1. There are usually many environmental regulations applied to the design and operation of storage tanks, often depending on the nature of the fluid contained within. The tanks can be used to hold materials such as petroleum, refined products (gasoline, kerosene, diesel, etc.), natural gas liquids, waste matter, water, chemicals, and other hazardous materials, all while meeting strict industry standards and regulations.

Storage tanks are available in many shapes: vertical and horizontal cylindrical; open top and closed top; flat bottom, cone bottom, slope bottom and dish bottom. Large tanks tend to have vertical cylindrical walls, or to have rounded corner transitions from vertical side wall to bottom profile, to easier withstand hydraulic hydrostatically induced pressure of contained liquid.

Typical storage tanks construction materials are metals, such as steel, stainless steel, and aluminum, and nowadays composites (fiber glass and/or carbon fiber reinforced polymers) that are welded or bonded together. A typical welded metallic floor 2 is shown in FIG. 2. The illustrated floor 2 includes bottom plates 3 that are joined at seems (e.g., welds) 31. Tank diameters may be between few feet to hundreds of feet. These tanks need to be maintained, inspected, and/or assessed using robotic vehicles.

The challenges with the vehicle positioning within a tank are that the earth's magnetic field cannot be used to provide a reference direction and Global Positioning System (GPS) does not penetrate the walls of the tank. Sonar can be used to visually estimate the inspection vehicle (also referred to as a remotely operated vehicle or ROV) location and its heading direction while moving. Furthermore, sonar can assist in moving the ROV from one portion of the tank to another, particularly if, as if often the case, the locations of the major internal features of the tank (e.g., obstacles 41 and sumps 42 shown in FIGS. 3A-4B) are known. These internal features, elements or components (structural and non-structural) may affect, restrict, and/or limit the movement of a robotic or remotely operated device inside of an in-service tank for example. Some of these elements are: heater coils, diffusers, temperature sensors, level sensors, mixers, inlets, outlets, piping, roof legs, sumps, debris, beams and columns among others. These elements can also affect accuracy of local positioning system and/or navigation system.

Some conventional technologies rely on an array of hydrophones positioned at known locations around the outside of the tank. These hydrophones can both transmit and receive acoustic signals. The transmit and receive capability is used during an initial calibration/setup mode, but the hydrophones also receive/transmit acoustic signals during normal operation to triangulate the position of ROV within the tank using the sonar transmitter located on the ROV. In operation, each hydrophone receives a signal from the ROV and uses the time delays between transmit and receive to determine position of the ROV.

Typically, the tank owner wants to determine the location and extent of wall loss along the tank bottom (floor) 2. Preferably, the tank owner also wants to reliably compare measurements (e.g., measurements of the remaining material thickness) that are made between a series of tank bottom inspections spaced over the period of a few years to see what is changing. Ideally, this requires an inspection and positioning system that can provide accurate locations (x, y) as well as the bottom thickness (also referred to as the wall thickness) or other measurements, so the tank operator can compare the results at specific locations to ascertain changes over the time. Therefore, the positioning accuracy should be sufficient to assure no ambiguity as to which flaw is which between the inspections. Generally, a positioning accuracy of approximately 5 cm or 2 inch is required. Because the tank bottom is fabricated as a mosaic of welded plates, the plate boundaries provide a convenient set of reference lines with which to align inspection data sets that were taken at different times. This reduces the problem of requiring a positioning system that is highly accurate over the full extent of the tank floor, which could be as large as 100 m in diameter.

Some conventional technologies rely on an underwater ROV combined with an ultrasonic array that provides a high-resolution map of the remaining thickness of the tank bottom plate, which is typically made of steel. Such ROV provides two primary functions. First, the ability to "fly" around in the liquid to easily move from place to place in the tank and around obstacles within the tank. Second, using tracks or other devices, the ROV moves along the bottom of the tank to keep the ultrasonic sensing array correctly positioned while collecting thickness reading from the floor of the tank. In addition, the ROV may include a lightweight (neutral or slightly negative buoyant) umbilical cord, for moving the ROV within the tank.

However, the conventional systems require relatively long time to accurately map tank feature, especially so in presence of obstacles. Additionally, many conventional positioning systems are sensitive to temperature variations inside the storage tanks that cause variations in speed of sound, which in turn reduces the accuracy of determining the position of the positioning system. In general, it is possible to improve the positioning accuracy of the system by having multiple passes over the tank floor, and then averaging the acquired result to arrive to a relatively accurate position estimate. However, such redundant mapping requires longer time of operation, thus making the mapping process more cumbersome and expensive. Therefore, systems and methods for improved mapping of the tank reservoir floors are needed.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one embodiment, a system for inspecting or maintaining a storage tank, includes a vehicle having: at least one sensor for determining properties of a storage tank; and a navigation system. The navigation system includes: an acoustic transmitter carried by the vehicle, and an inertial measurement unit (IMU) sensor configured to at least partially determine a location of the vehicle with respect to the storage tank. The vehicle also includes a propulsion unit configured to move the vehicle within the storage tank; and an acoustic receiver fixed with respect to the storage tank. The vehicle moves inside the storage tank in concentric arcs with respect to the acoustic receiver.

In one aspect, the acoustic transmitter is an acoustic pinger, and the acoustic receiver is a hydrophone.

In another aspect, the acoustic receiver is a bright acoustic reflector inside the storage tank.

In one aspect, the the bright acoustic reflector inside the storage tank is an acoustic retroreflector string or a corner acoustic reflector.

In one aspect, a shape of the bright acoustic reflector is selected from a group consisting of a trihedral topology, an octahedral topology, a star topology, a cross topology and an offset-cross topology.

In one aspect, the system also includes a second acoustic receiver fixed with respect to the storage tank, where the vehicle at least partially moves inside the storage tank in another set of concentric arcs with respect to the second acoustic receiver.

In one aspect, the at least one sensor for determining properties of the storage tank is configured to determine thickness of a tank wall or a tank floor.

In another aspect, at least one sensor for determining properties of the storage tank is an ultrasound sensor such as ultrasonic transducers, phased array ultrasonics and electromagnetic acoustic transducers (EMAT) or an electromagnetic sensor such as eddy current, pulse eddy current (PEC), and magnetic flux leakage (MFL) among others.

In one aspect, the vehicle is a remotely operated vehicle (ROV) or an autonomously operated vehicle.

In another aspect, the navigation system of the ROV further comprises a sensor selected from a group consisting of: a hydrostatic pressure sensor configured for depth measurements, and an optical ranging system.

In another aspect, the optical ranging system is a laser-based system such as lidar (light detection and raging).

In one embodiment, a method for inspecting or maintaining a storage tank includes: positioning a vehicle at a first location inside the storage tank by a propulsion unit of the vehicle. The vehicle includes at least one acoustic receiver (RX), at least one acoustic transmitter (TX), at least one inertial measurement unit (IMU), and at least one encoder. The method also includes: receiving, by the at least one RX of the vehicle, a first acoustic signal from an acoustic hydrophone attached to the storage tank in a first location; emitting, by the at least one TX of the vehicle, a second acoustic signal toward a bright acoustic reflector attached to the storage tank in a second location; receiving, by the at least one RX of the vehicle, a second reflected acoustic signal from the bright acoustic reflector; determining a first azimuth angle of the vehicle with respect to a first distance from the acoustic hydrophone and a first distance from the bright acoustic reflector; orienting the vehicle in a direction of an azimuth direction; moving the vehicle along the azimuth direction to a second location of the vehicle inside the storage tank; determining the second location of the vehicle based on the at least one IMU and the at least one encoder; determining a second azimuth angle of the vehicle at the second location with respect to a second distance from the acoustic hydrophone and a second distance from the bright acoustic reflector; and verifying that the second azimuth angle corresponds to the second location of the vehicle as determined based on the at least one IMU and the at least one encoder.

In one aspect, the method also includes moving the vehicle to a third location along a straight line through the first location and the second location.

In one aspect, the method also includes sensing a property of the storage tank at the first location by at least one sensor of the vehicle.

In one aspect, the vehicle is a remotely operated vehicle (ROV) or an autonomously operated vehicle.

In another aspect, the RX, the TX, the IMU and the encoder of the vehicle are elements of a navigation system of the ROV, the navigation system further comprising at least one sensor selected from a group consisting of: a hydrostatic pressure sensor configured for depth measurements, and an optical ranging system.

In one embodiment, a non-transitory computer readable medium having computer executable instructions stored thereon that, in response to execution by one or more processors of a computing device, cause the computing device to perform actions including positioning a vehicle at a first location inside the storage tank by a propulsion unit of the vehicle. The vehicle includes at least one acoustic receiver (RX), at least one acoustic transmitter (TX), at least one inertial measurement unit (IMU), and at least one encoder. The method also includes: receiving, by the at least one RX of the vehicle, a first acoustic signal from an acoustic hydrophone attached to the storage tank in a first location; emitting, by the at least one TX of the vehicle, a second acoustic signal toward a bright acoustic reflector attached to the storage tank in a second location; receiving, by the at least one RX of the vehicle, a second reflected acoustic signal from the bright acoustic reflector; determining a first azimuth angle of the vehicle with respect to a first distance from the acoustic hydrophone and a first distance from the bright acoustic reflector; orienting the vehicle in a direction of an azimuth direction; moving the vehicle along the azimuth direction to a second location of the vehicle inside the storage tank; determining the second location of the vehicle based on the at least one IMU and the at least one encoder; determining a second azimuth angle of the vehicle at the second location with respect to a second distance from the acoustic hydrophone and a second distance from the bright acoustic reflector; and verifying that the second azimuth angle corresponds to the second location of the vehicle as determined based on the at least one IMU and the at least one encoder.

In one embodiment, a system for inspecting or maintaining a storage tank, includes a vehicle having: at least one sensor for determining properties of a storage tank; and a navigation system. The navigation system includes: a first acoustic transceiver (TRX) carried by the vehicle, and an inertial measurement unit (IMU) sensor configured to at least partially determine a location of the vehicle with respect to the storage tank. The vehicle also includes a propulsion unit configured to move the vehicle within the storage tank; and a second acoustic TRX fixed with respect to the storage tank. The vehicle moves inside the storage tank in concentric arcs with respect to the second acoustic transceiver.

In one aspect, the first acoustic TRX is an acoustic pinger, and the second acoustic TRX is a hydrophone.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

While illustrative embodiments have been illustrated and described, it will be appreciated that various changes can be made therein without departing from the spirit and scope of the invention. In some embodiments, a vehicle that carries sensors traverses on or next to the tank floor to assure good ultrasonic measurement coverage of the tank floor. In other embodiments, the vehicle may be positioned and/or directed while "flying" (i.e., swimming in the liquid inside the tank). Typically, the positional accuracy requirements are different between the two operational modes. When the vehicle (e.g., an ROV) is inspecting the floor, a minimized overlap of the adjacent scans minimizes the amount of time required to inspect the tank, while also assuring that portions of the tank bottom are not missed.

Measurements of the 2D position, i.e., (x, y) or (r, θ), on the tank bottom are typically wanted to establish a map of corrosion or other defects at the tank bottom (tank floor). Since the ROV and the ultrasonic source/receiver may be at different elevations, a distance between the ROV and each hydrophone is established within a 3D space. However, these 3D measurements can be reduced to a 2D problem by knowing the height of each hydrophone and the height of the transmitter(s) on the ROV relative to the bottom of the tank, followed by computing the projected distance along the bottom of the tank. In many embodiments, the measurements combine an inertial measurement unit (IMU) with an acoustic ranging system constructed from a combination of transmitters (TXs) and receivers (RXs) that are hydrophones or ultrasonic devices. In operation, an absolute position of the vehicle provided by the hydrophone triangulation (acoustic positioning system or APS) can be combined with IMU data, such as rate gyro and accelerometer data, using Kalman or other filter techniques to provide real-time estimates of position. In some embodiments, the ROV operator has sufficient real-time information from the system (e.g., on the order of 5 updates per second for small latency, for a vehicle speed of about 0.1-0.2 m/s) to move along a path to collect floor inspection data and then follow along that same path to collect adjacent data such as wall thickness. Such mapping should be performed with sufficient accuracy (e.g., better than 5 cm or 2 inch) to ensure there are no gaps between the two inspection or measurement data sets. Conversely, poor navigation accuracy requires additional overlap between adjacent floor scans to cover the whole floor area, which reduces inspection efficiency due to longer data collection times.

Different embodiments of the present technology may be used in indoors applications. Indoor applications refer to confined spaces such as tanks, piping, pressure vessels, GPS denial areas, and/or magnetic denial areas or spaces among others.

ROV/Robotic Platform

Figure 5:
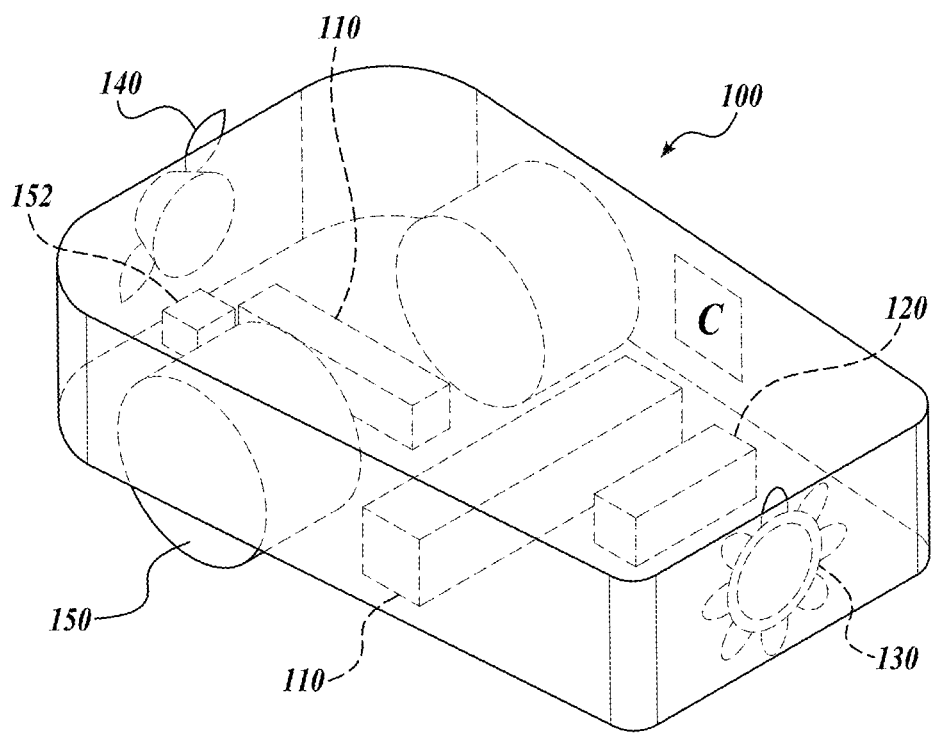
FIGS. 5 and 6 illustrate components of a submersible robotic vehicle according to embodiments of inventive technology.

FIG. 5 is a schematic of a robotic vehicle platform in accordance with embodiments of inventive technology. The illustrated vehicle 100 includes propulsion (e.g., thrusters 140, traction wheels 150, steering wheels 130), navigation and positioning system 120, encoders 152 and sensing arrays 110. In different embodiments, the vehicle 100 can be a remotely operated vehicle (ROV), a crawler, an underwater vehicle, a semi-autonomous vehicle, an autonomous vehicle, a robot, a car, a ball, a snake, a legged device, or a mechanical fish.

Figure 6:
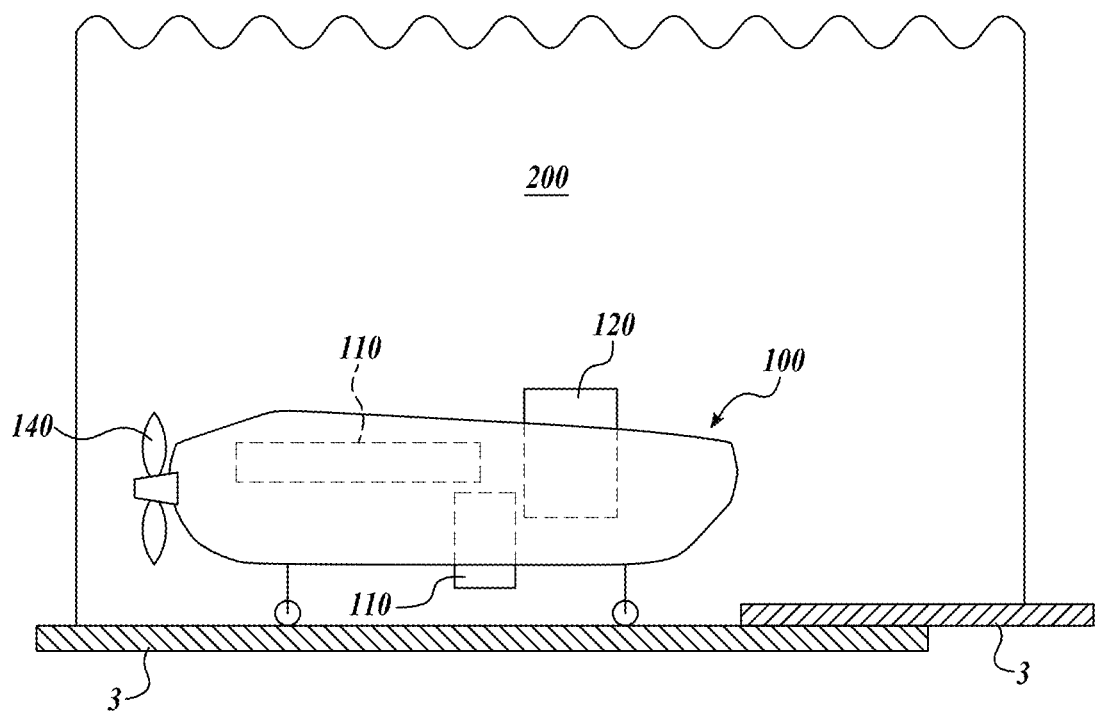

The ROV or robotic platform may be a watercraft capable of independent operation under water (or any other type of liquid) with a propulsion unit and a set of sensors 110 (for determining properties of the tank) and the navigation and positioning system 120 (for determining location and orientation of the vehicle) such as hydrostatic pressure sensors (for depth measurements), range sensors for vertical and radial measurements (longitudinal and/or transversal measurements), high definition visual cameras, sonar, near infrared (NIR) detectors, UV detectors, lasers, lidars, inclinometers (on longitudinal and/or transversal directions respect to the ROV axes), a positioning system (for x, y, and z coordinates inside the tank or structure), a tank floor/wall thickness measurement sensor (ultrasound, electromagnetic), an inertial navigation system (INS), an inertial measurement unit (IMU), a communication module, battery/power management system, and a CPU (Central Processing Unit) to handle data acquisition (illustrated as a controller C), in-situ data processing, and postprocessing among others. In different embodiments, the ROV or robotic platform can be a mini-submarine (FIGS. 6 and 7) or a crawler (FIG. 8) among other potential designs.

Figure 7:
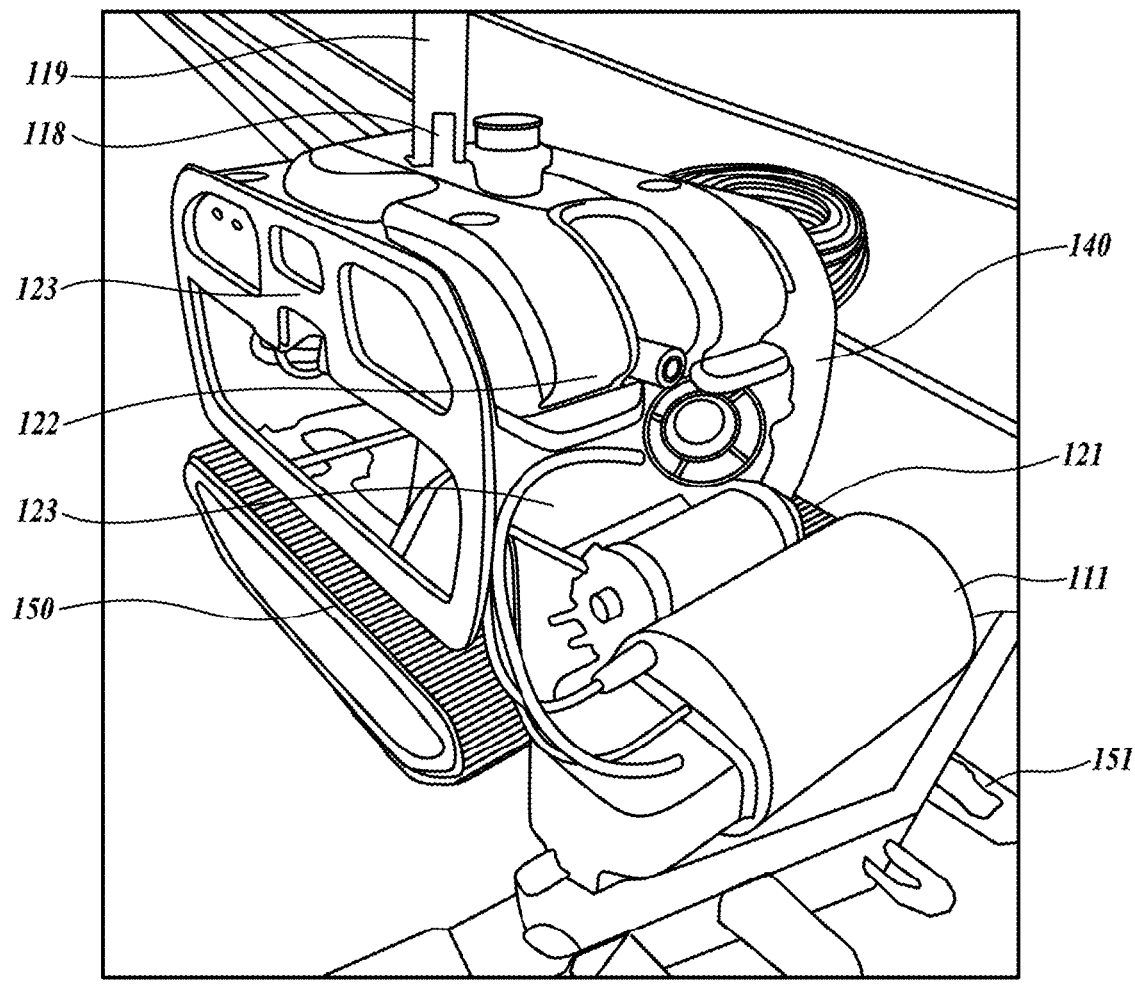
FIG. 7 illustrates a remotely operated vehicle (ROV) for in-service tank floor stress assessment according to an embodiment of inventive technology.
Figure 8:
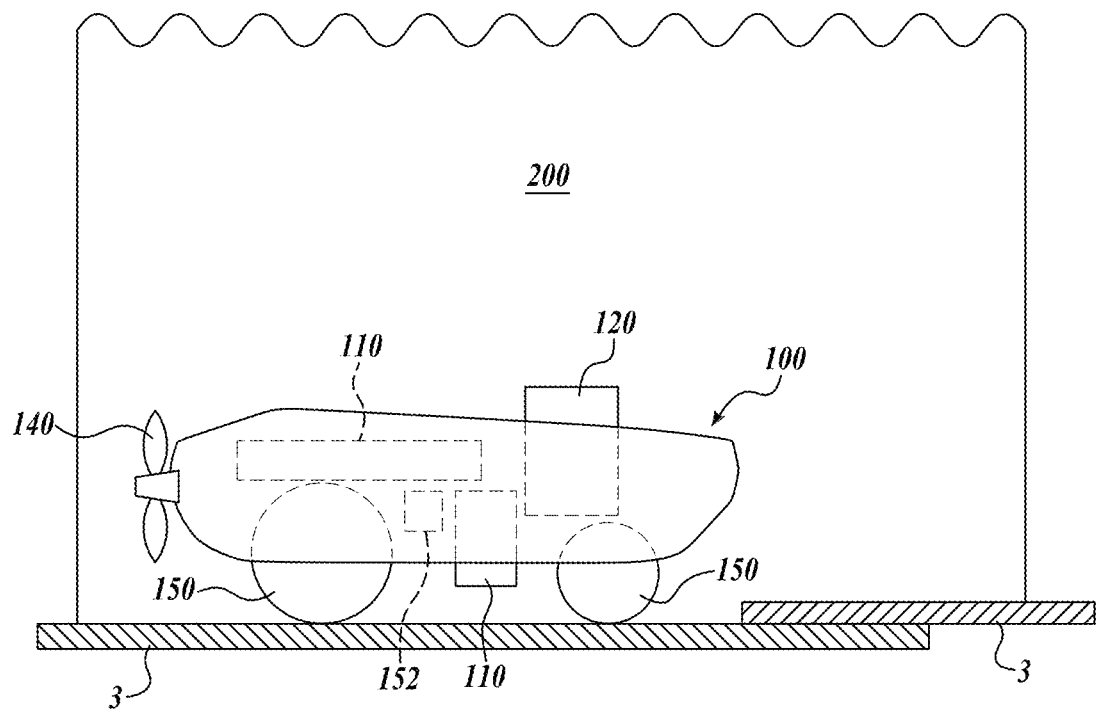
FIG. 8 illustrates components of a submersible robotic vehicle with traction wheels according to an embodiment of inventive technology.

FIGS. 7 and 8 show ROVs for in-service tank floor inspection system indicating an ultrasound phased array systems 111 for wall thickness or crack detection of tank floor and walls, a sonar 118 for navigation, an acoustic pinger 119 for positioning, a visual camera 122 for navigation and obstacle avoidance, tracks 150, encoders 152 and thrusters 140 for propulsion (crawling and swimming), an inertial navigation system (INS) 121, a plow 151 for displacing debris, sediment or sludge at the bottom of the tank, and pressure sensors 123 for depth range measurements. In different embodiments, the sonar 118 may be a receiver (RX), a transmitter (TX), or a transceiver (TRX).

Figure 9:
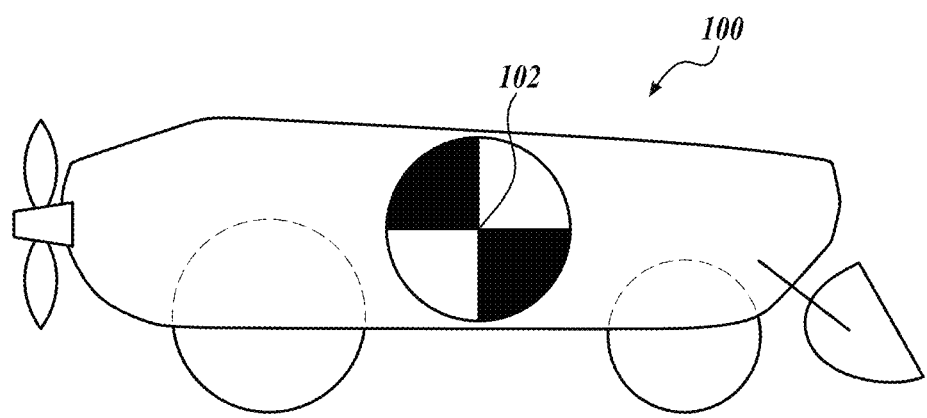
FIG. 9 shows center of buoyancy of a submersible robotic vehicle according to an embodiment of inventive technology.
Figure 10A:
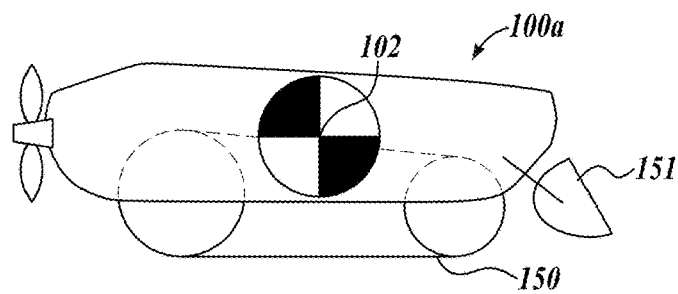
FIGS. 10A-10E illustrate submersible robotic vehicle configurations for navigating bottom of a tank floor according to embodiments of inventive technology.
Figure 10B:
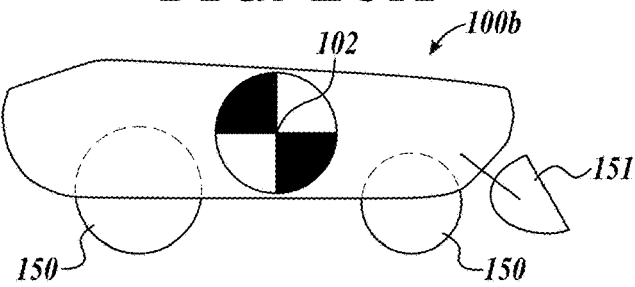
Figure 10C:
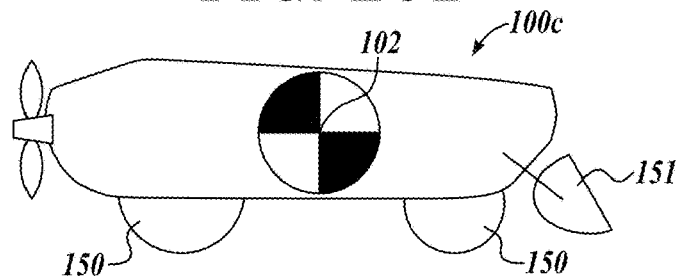
Figure 10D:
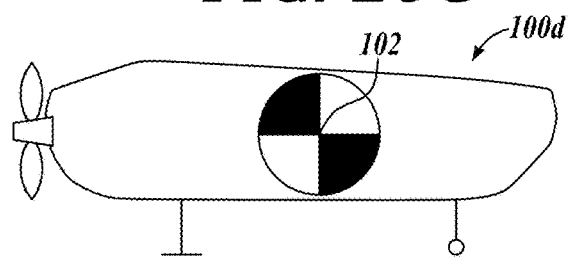
Figure 10E:
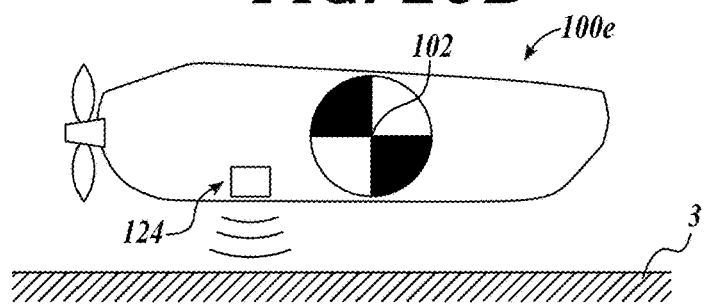

In the case of an underwater vehicle, the centers of gravity and buoyancy 102 are important for stability, control and attitude of the vehicle 100 (FIG. 9). These centers may differ depending on, for example, vehicle configuration, materials used, and operational liquid (e.g. density). Some ROV designs are depicted in FIGS. 10A-10E, where the systems 100a-100e can use tracks, thrusters (for thrust vectoring), propellers, wheels, skids, or a combination of some of them for propulsion, contact with the tank surface, and control. Thrusters and steering 130 control 3D displacement and navigation, thus determining whether the vehicle swims or flies in the liquid inside the structure. Ballast tanks can also be filled with water or air to modify the ROV weight and buoyancy for ascent or descent inside the tank. In addition, the use of mechanical devices such as wheels or skids allows accurate adjustment of the vertical separation or position between the vehicle (center of gravity or buoyancy for example) from the tank floor.

Figure 11:
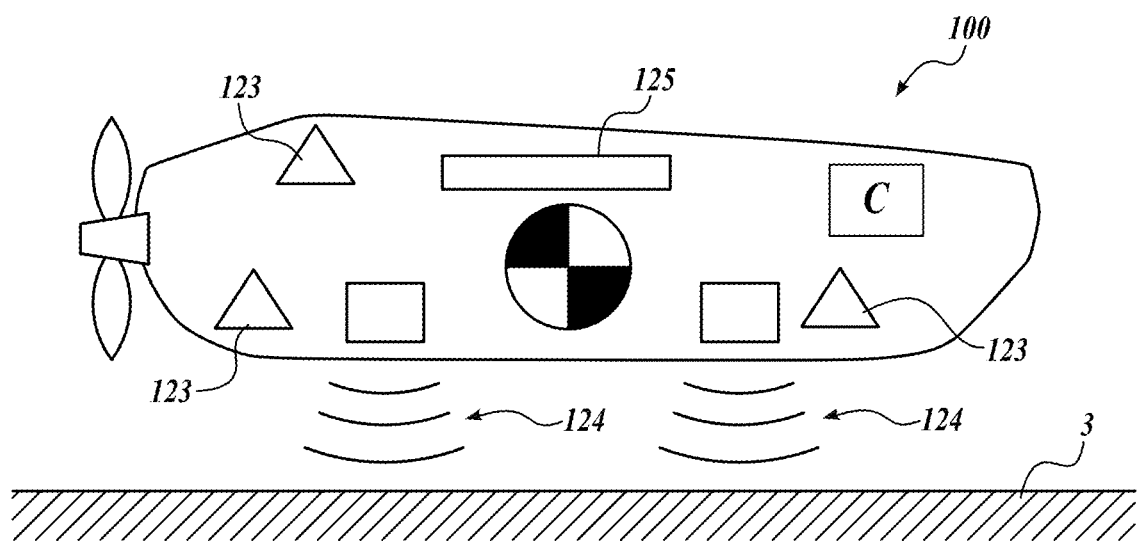
FIG. 11 illustrates a network of sensors for depth (pressure), inclination, and distance to the bottom of tank (range) according to an embodiment of inventive technology.

FIG. 11 illustrates the ROV system that includes non-contact range sensors 124 to measure a distance between the sensor or ROV and the floor top surface. Inclinometers 125 (e.g., one or more accelerometers) may determine inclination of the ROV. In some embodiments, the ROV may include contact or non-contact range sensors (e.g., ultrasonics) on the sides to detect and/or measure a distance between the ROV and the tank shells/walls. The sensors (range devices, pingers, hydrophones, etc.) can be used to detect features on the tank shell such as welds, inlets, etc. The sensors can be electromagnetic in nature (eddy current, magnetic, capacitance, etc.), optical in nature (laser based, visual), acoustical (ultrasound, sonar), or other. The ROV may be controlled by a controller C (e.g., a computer, smart device, digital controller, etc.) that includes nonvolatile memory with programmable instructions.

Indoor Positioning System

Figure 12:
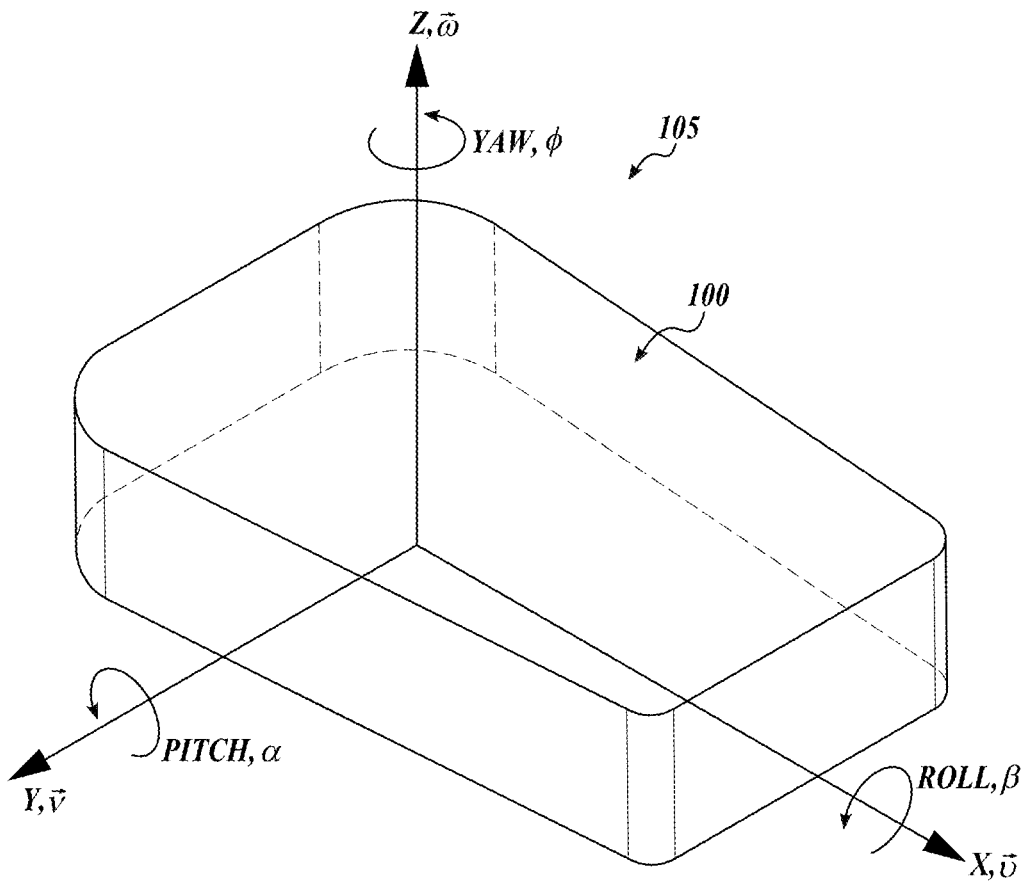
FIG. 12 illustrates three-axes coordinate system for a submersible robotic vehicle.

The main axes for motion and rotation of the ROV are illustrated in FIG. 12 as a coordinate system 105 having axes X, Y, Z, and pitch angle ($\alpha$), roll angle ($\beta$), and yaw angle ($\varphi$). An indoor positioning system (IPS) locates objects or people inside a building or storage tank (generally corresponding to a GPS denial area) using light, radio waves, magnetic field, electromagnetic waves, acoustic signals, and/or other sensory information collected by a robotic platform (e.g., ROV) and/or array of sensing devices.

Figure 14:
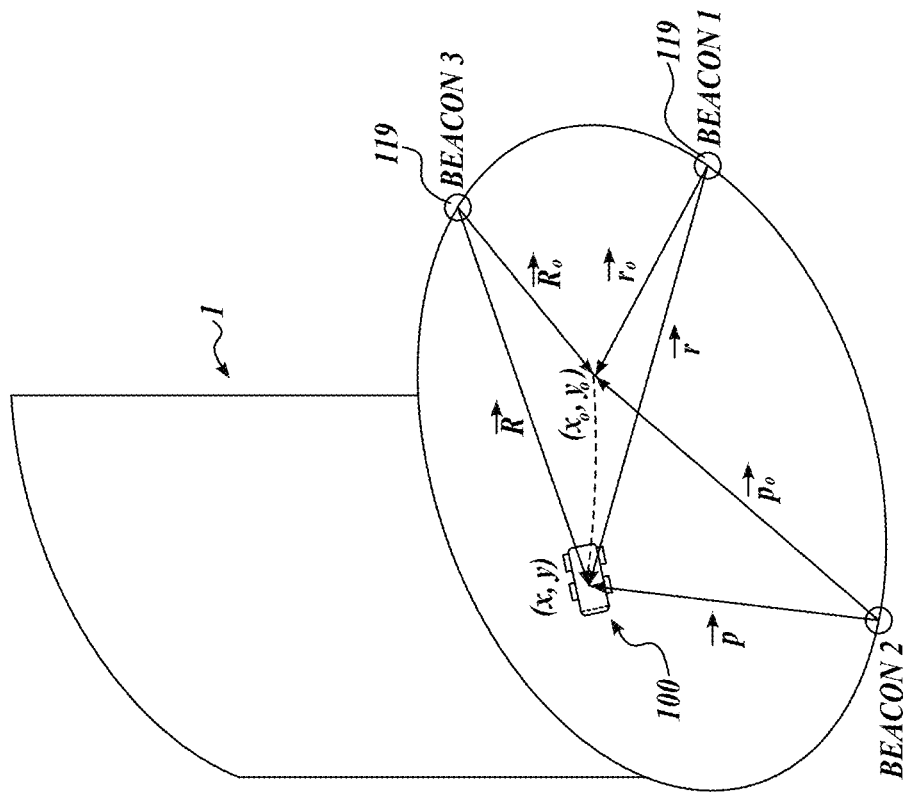
FIGS. 13-17 illustrate local positioning system with references, marks or features inside the structure and sensor mounted on the ROV according to different embodiments of inventive technology.
Figure 13:
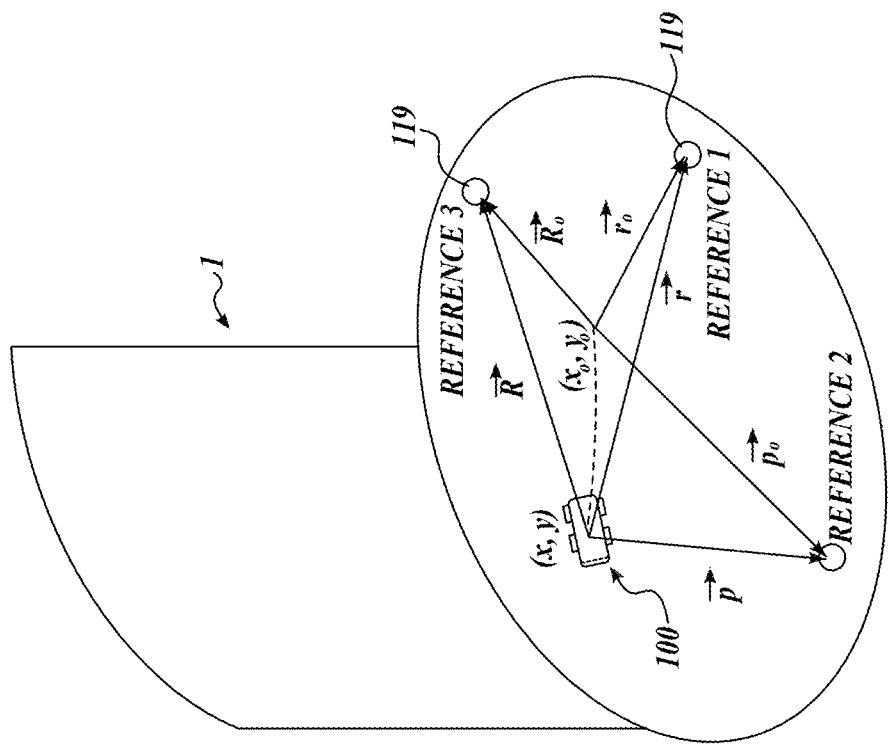
Figure 16:
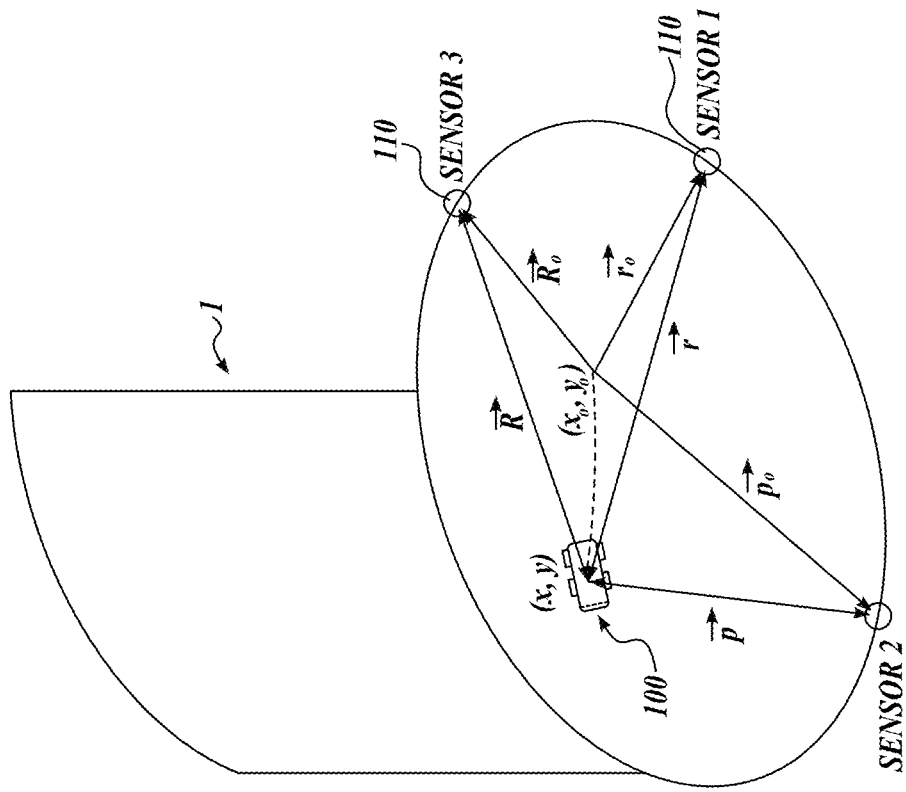
Figure 15:
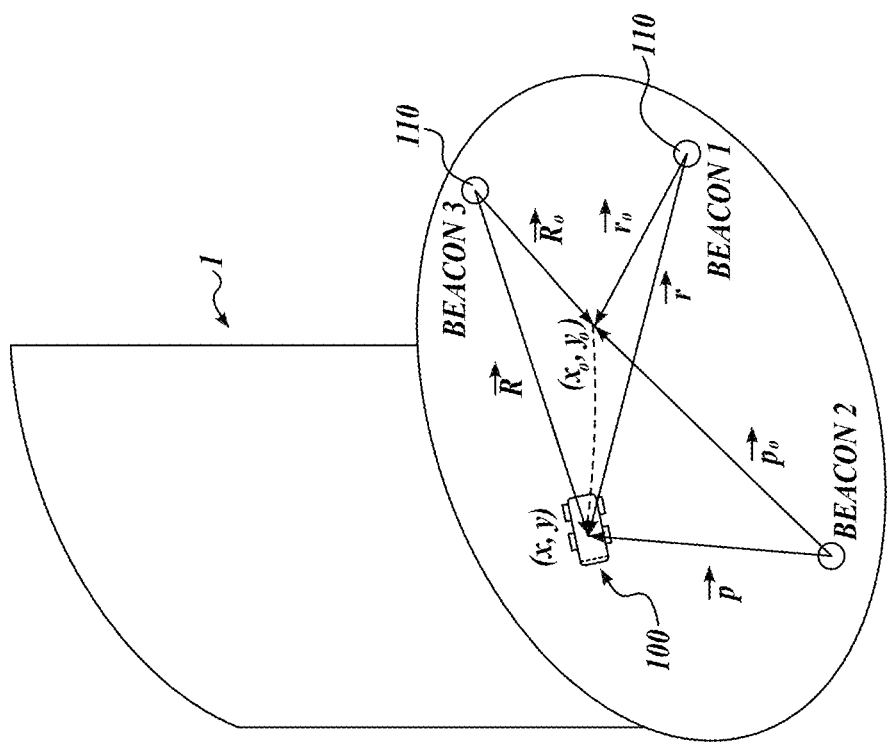
Figure 17:
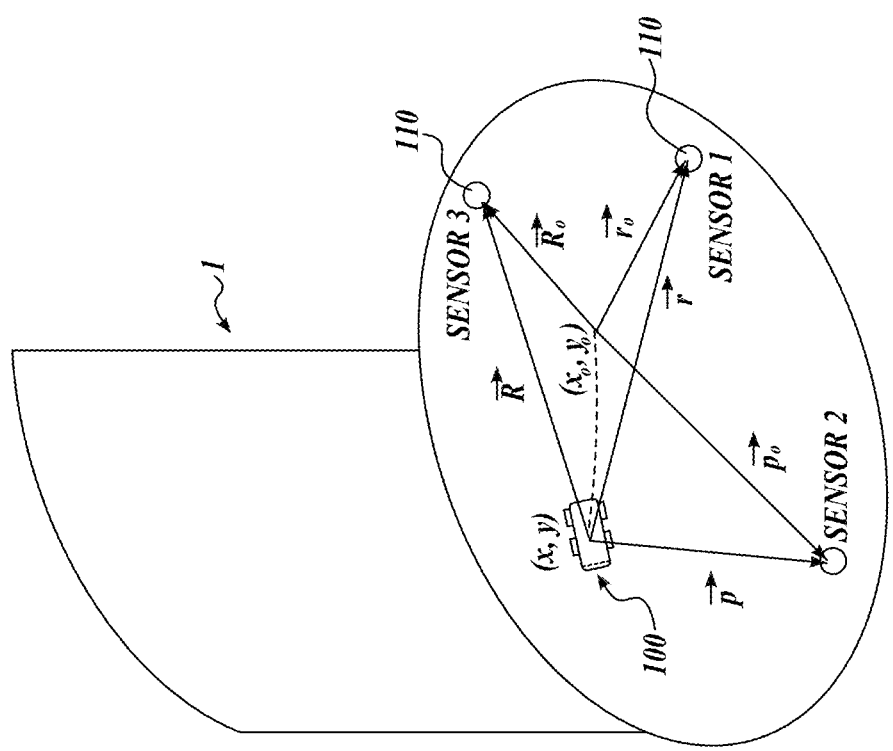

IPSes may use different technologies, including distance measurement to nearby anchor nodes (nodes with known fixed positions, e.g., acoustic/ultrasonic beacons), magnetic positioning, inertial measurement unit (IMU)/dead reckoning, triangulation by angle of arrival, triangulation by time of arrival, position based on visual markers, location bases on known visual features (FIG. 13), long range sensors, laser beacons, ultrasound pingers and hydrophones, visible light communication, ultrasound, radar and optically ranging system (e.g., lidar) among others (collectively marked as numeral 119 in FIG. 17). These measurements may either actively locate the ROV or robotic platform or provide an ambient location or environmental context for sensing the properties of the tank. In addition, the beacons or emitters (e.g., pingers 119) can be placed on the periphery (FIG. 14) or inside the tank (FIG. 15) with sensors (e.g., hydrophones) mounted on the ROV. In other embodiments, the beacon or emitter can be mounted on the ROV or robotic platform with sensors placed on the structure periphery (FIG. 16) or inside the tank (FIG. 17).

In some embodiments, the localized nature of an IPS results in design fragmentation, with systems making use of various optical, radio, or even acoustic technologies. For example, under some use scenarios, at least three independent measurements are needed to unambiguously find a location (triangulation as shown in FIGS. 13-17). A method for reducing the error budget is required for smoothing that compensates for stochastic (unpredictable) errors. In some embodiments, the system (e.g., the instrumented ROV) includes information from other systems for resolving ambiguities and to enable error compensation.

Detection of the device orientation (often referred to as the compass direction, heading, or attitude) can be achieved either by detecting landmarks or known objects inside in real time, by using trilateration with beacons, or using information from the IMUs (e.g., accelerometers or gyroscopes).

Robotic Mapping

In many embodiments, the goal for an autonomous robot or ROV is to construct (or use) a map (outdoor use) or floor plan (indoor use) and to localize itself (x, y, z), its entry/exit points, recharging bases or beacons/sensors in it. Generally, robotic mapping deals with the study and application of ability to localize itself in a map/plan and sometimes to construct the map or floor plan by the autonomous robot or ROV.

In operation, the ROV or robot has two sources of information: passive features and active devices. Passive features can be signatures that are natural to the environment (e.g., corners, edges, bumps, pipes, inlets, etc.) or artificial/enhanced passive devices that have been introduced into the environment (e.g., corner reflectors, mirrors, signal absorbent/capturing devices, etc.) that provide a clear or distinctive response that can be differentiated from the background. Image processing techniques can be used to detect these passive features for position and navigation. Active devices such as transmitters (e.g., pingers) and/or sensors (e.g., hydrophones, encoders, gyros, etc.) are introduced or attached to the environment for generating and/or capturing signals. The gathered and processed responses provide information about range, orientation and position of the ROV or specific features of the storage tank.

When in motion, the system can use dead reckoning methods such as tracking the number of revolutions of its wheels or gyros (information from the INS/IMU) to give the absolute position of the robot. However, such determinations are subject to cumulative error which can grow quickly. In the case of robot mounted-based sensors such as cameras, microphones, laser, optically ranging system (e.g., lidar) or sonar, the system will have "perceptual aliasing." This means that two different places can be perceived as the same. For example, in a building, it may be difficult to determine a location solely with the visual information, because all the corridors may look the same. Therefore, improved systems and methods to recalibrate positioning errors (i.e., by resetting or reducing errors) and/or discern the actual position of the ROV are needed.

The internal representation of the map can be "metric" or "topological":

The metric framework is the most common for humans and considers a two-dimensional space (x, y) in which it places the objects and/or measurements such as wall thickness, floor inclination, and depth among others. The objects are placed with precise coordinates. This representation is useful, but sensitive to noise and also difficult to calculate the distances precisely.

The topological framework only considers places and relations between them. Often, the distances between places are stored. The map is then a graph, in which the nodes correspond to places and the arcs correspond to the paths.

Many techniques use probabilistic representations of the map to handle uncertainty. There are several methods of map representations, i.e., free space maps, object maps, and composite maps. These methods employ the notion of a grid, but permit the resolution of the grid to vary so that the grid becomes finer where more accuracy is needed and coarser where the map is uniform. Map learning cannot be separated from the localization process, and a difficulty arises when errors in localization are incorporated into the map. This problem is commonly referred to as Simultaneous Localization and Mapping (SLAM).

Furthermore, a determination is made as to whether the ROV or robot is in a part of tank already stored or never visited. One way to solve this problem is by using electromagnetic beacons, acoustic beacons, and visible light communication (VLC) for example.

Figure 1:
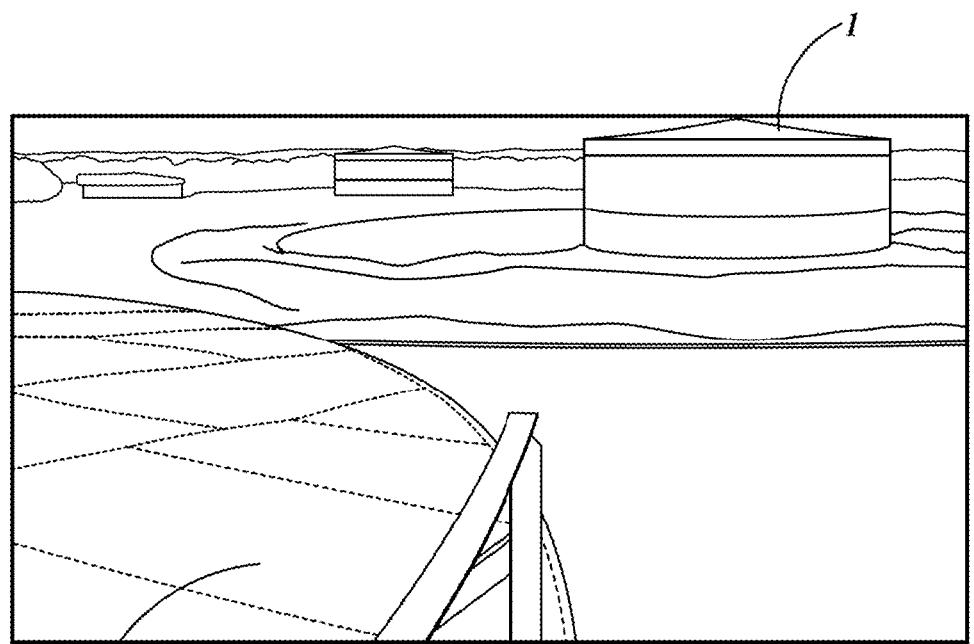
FIG. 1 illustrates a steel storage tank farm according to prior art.
Figure 2:
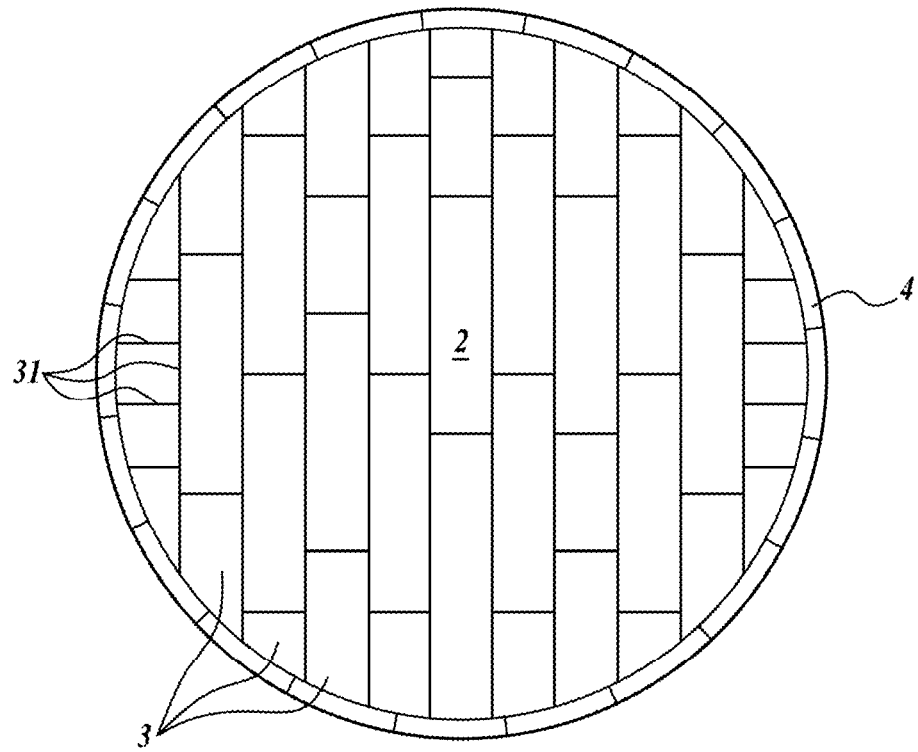
FIG. 2 illustrates a typical tank floor layout with annular plate according to prior art.
Figure 3A:
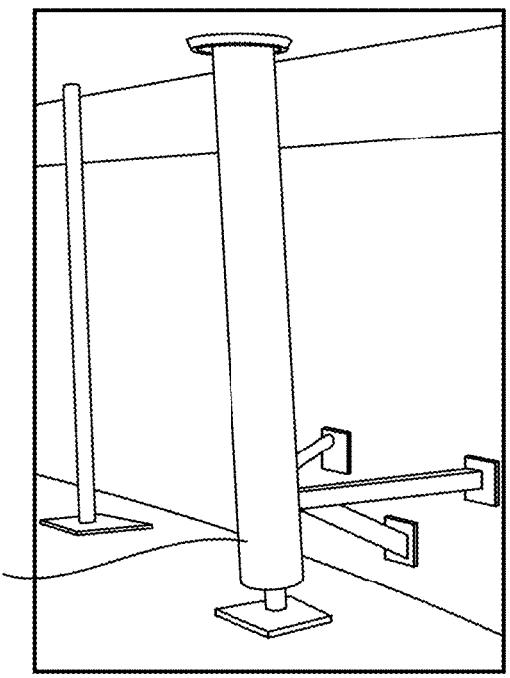
FIGS. 3A-3D illustrates structural elements inside a storage tank (e.g., roof legs, level columns, columns, supporting beams, nozzle inlets, thermocouples) according to prior art.
Figure 3B:
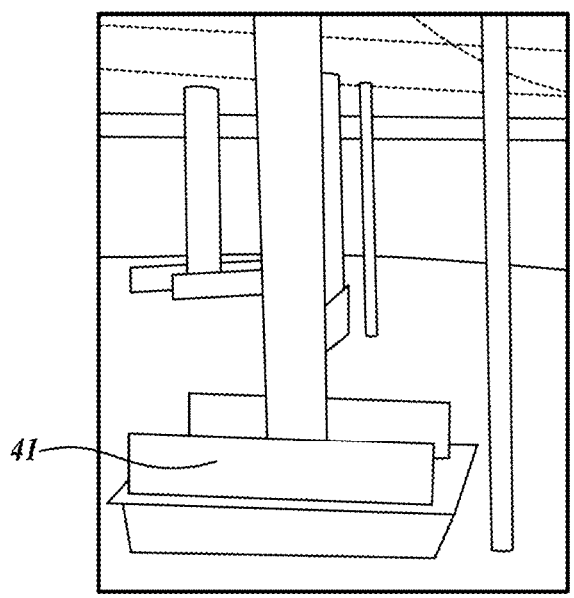
Figure 3C:
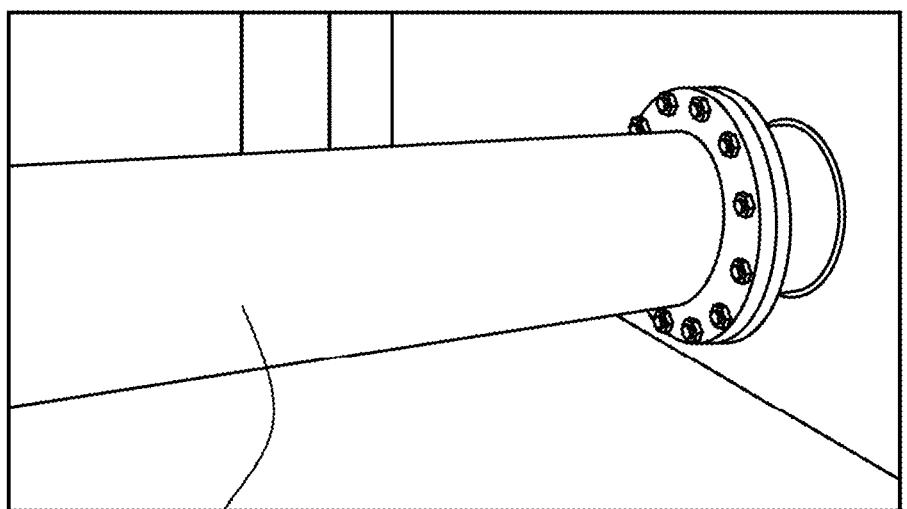
Figure 3D:
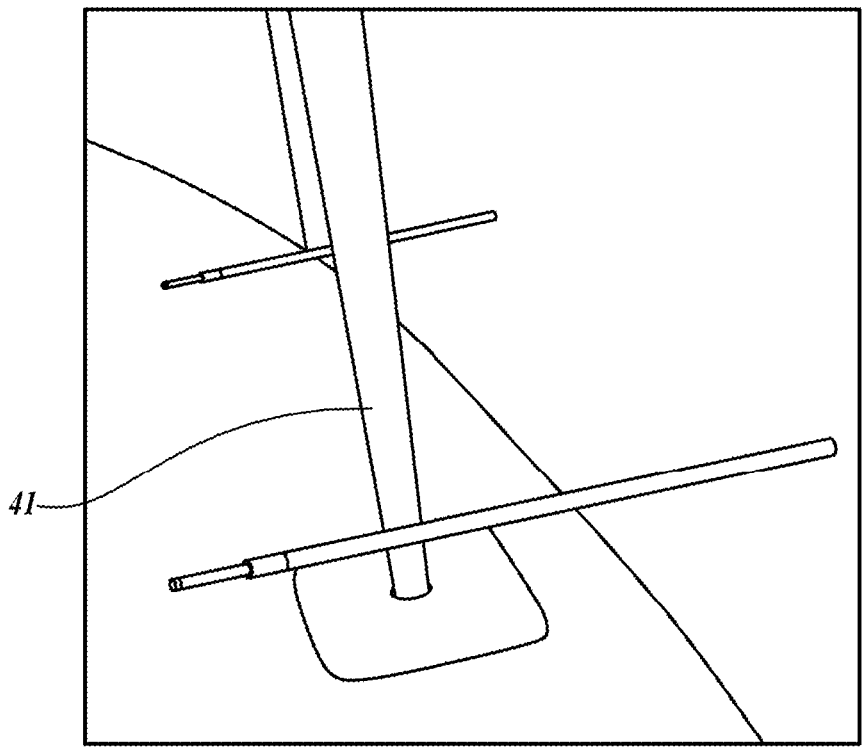
Figure 4A:
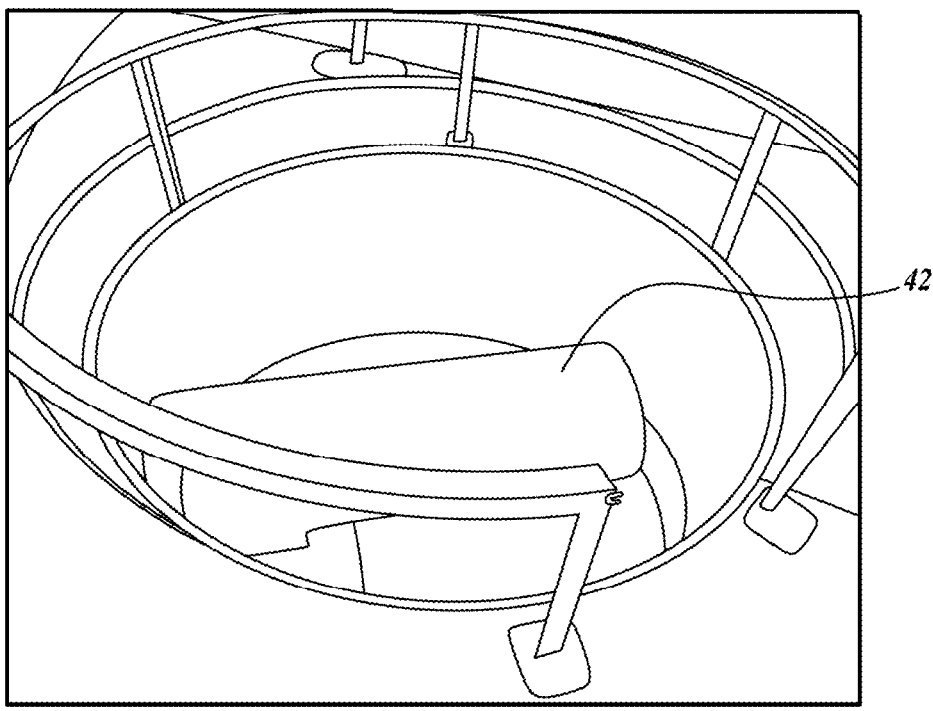
FIGS. 4A and 4B illustrates sumps on the tank floor according to prior art.
Figure 4B:
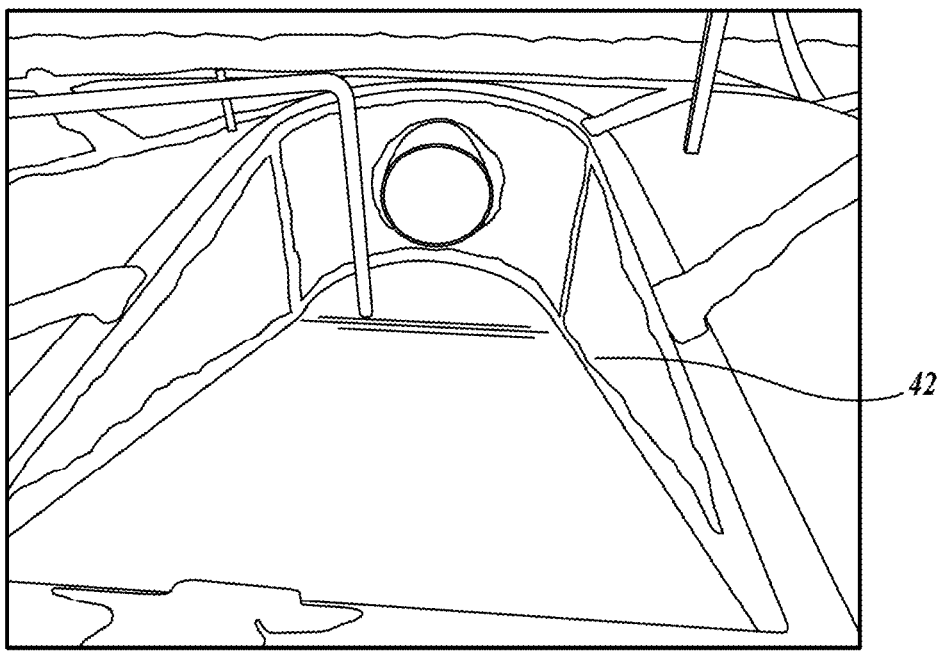

Path planning is another issue, as it allows the ROV or robot to get from point A to point B since a maximum scanned or measured area on the tank floor is desired. Path planning algorithms are measured by their computational complexity. The feasibility of real-time motion planning is dependent on the accuracy of the map (or floorplan), on ROV/robot localization, and on the number of obstacles. Topologically, the problem of path planning is related to the shortest path problem of finding a route between two nodes in a graph. For navigation inside tanks, the system identifies and avoids obstacles such as piping, beams, columns, sums, and sensors for example (FIGS. 3 and 4) to eliminate potential collisions, damage on the ROV or the tank, or umbilical cord entanglement. These obstacles may also obscure signals used for positioning and navigation.

Furthermore, alternative navigation systems can be used with floor plan and beacons instead of maps for indoor robots, combined with localization wireless/acoustic hardware. Electromagnetic beacons and sensors can help for low cost robot navigational systems.

In some embodiments, a map of the internal tank structure is generated incrementally to determine where the ROV is in that map or tank using autonomous vision-based navigation algorithms. When using multiple sensors, it is possible to apply computer vision algorithms to videos, measure acceleration, recognize change in orientation and develop a low-level map that recognizes boundaries of the area and any obstacles along the path. Inertial measurement units (IMU), sensors that include gyroscopes and accelerometers, etc., provide additional data needed to accomplish the precise simultaneous localization and mapping. In some embodiments, vision-aided navigation technologies use camera technology and electro-optic imaging sensors and applying them from a navigational perspective. The combination is needed to overcome the limitations of IMU information, which tends to lose accuracy over time due to inertial drift. A visual navigation and positioning system will be very helpful for a robot navigation inside a three-dimensional structure such as those on floating production storage and offloading (FPSO) vessels.

Positioning Solutions for Tank Bottom Vehicles

Acoustic Positioning System (APS) Assessment

A MATLAB simulation was developed to assess the influence of different parameters on the ROV position accuracy. The simulation generates different tanks and hydrophone topologies in terms of dimensions, units, and locations. Absolute ranges are computed from various vehicle locations. During the simulation, the liquid temperature inside the tank was be modified, and random range errors could be applied to compare the true ROV position with the computed position based on the ranges due to random errors with or without temperature variations. As is typical with GPS, when satellites come and go as part of the position solution, the computed position will make a step change in location. An APS version of GPS encounters the same problem. As the ROV moves within the tanks, whether "flying" or collecting data on the bottom of the tank, the position will likely move in jumps due the changing combination of hydrophones that are visible or multi-path as the sound passes around an obstacle. This is complicated by the fact that the liquid temperature is not uniform throughout the tank causing these jumps to be larger.

The speed of sound in the working liquid changes with temperature of the liquid. In different scenarios, the liquid temperature differences can be produced by uneven heating of the sun over the tank structure, side winds, snow accumulation, rain, humidity, weather, etc. The simulations scale the measured range errors by the square of the distance. Different cases that illustrate these situations are described below.

Case Study: 8-Hydrophones and Constant Temperature

On this case, the simulation used 8 hydrophones equally spaced around a 10 m diameter tank and the ranging errors were assumed to be 5 mm at 3 m, corresponding to more than 1 part in 1000. The hydrophones are represented by the small circles 110 around the periphery of the tank wall. Four vehicle locations were simulated and shown in FIG. 18 as intersecting range circles. The calibration temperature is the reference temperature used to convert distances to time and vice versa. Therefore, provided that the tank has such uniform temperature, the circles of constant signal delay from each hydrophone to the ROV would intersect at the true ROV location.

The simulated range errors are scaled by the square of the distance, and the calculations are repeated 100 times using a least square minimization process to determine the estimated vehicle position for each of the 100 random ranges. Table 1 below provides the standard deviation, average position and error between the mean and actual positions (x, y) of the 4 vehicle locations.

TABLE 1

Statistics for 8 hydrophones and 4 vehicles at nominal temperature.
nTest: 100, Range error: 0.005 m @ 3.00 m

| v | std_x | std_y | mean_x | mean_y | error_x | error_y |
|---|-------|-------|--------|--------|---------|---------|
| 1 | +0.006 | +0.007 | −0.000 | +0.000 | −0.000 | +0.000 |
| 2 | +0.010 | +0.008 | −2.500 | −0.000 | −0.000 | −0.000 |
| 3 | +0.020 | +0.012 | +3.694 | +1.531 | −0.001 | +0.000 |
| 4 | +0.018 | +0.011 | +4.079 | −1.902 | +0.001 | −0.000 |

Figure 18:
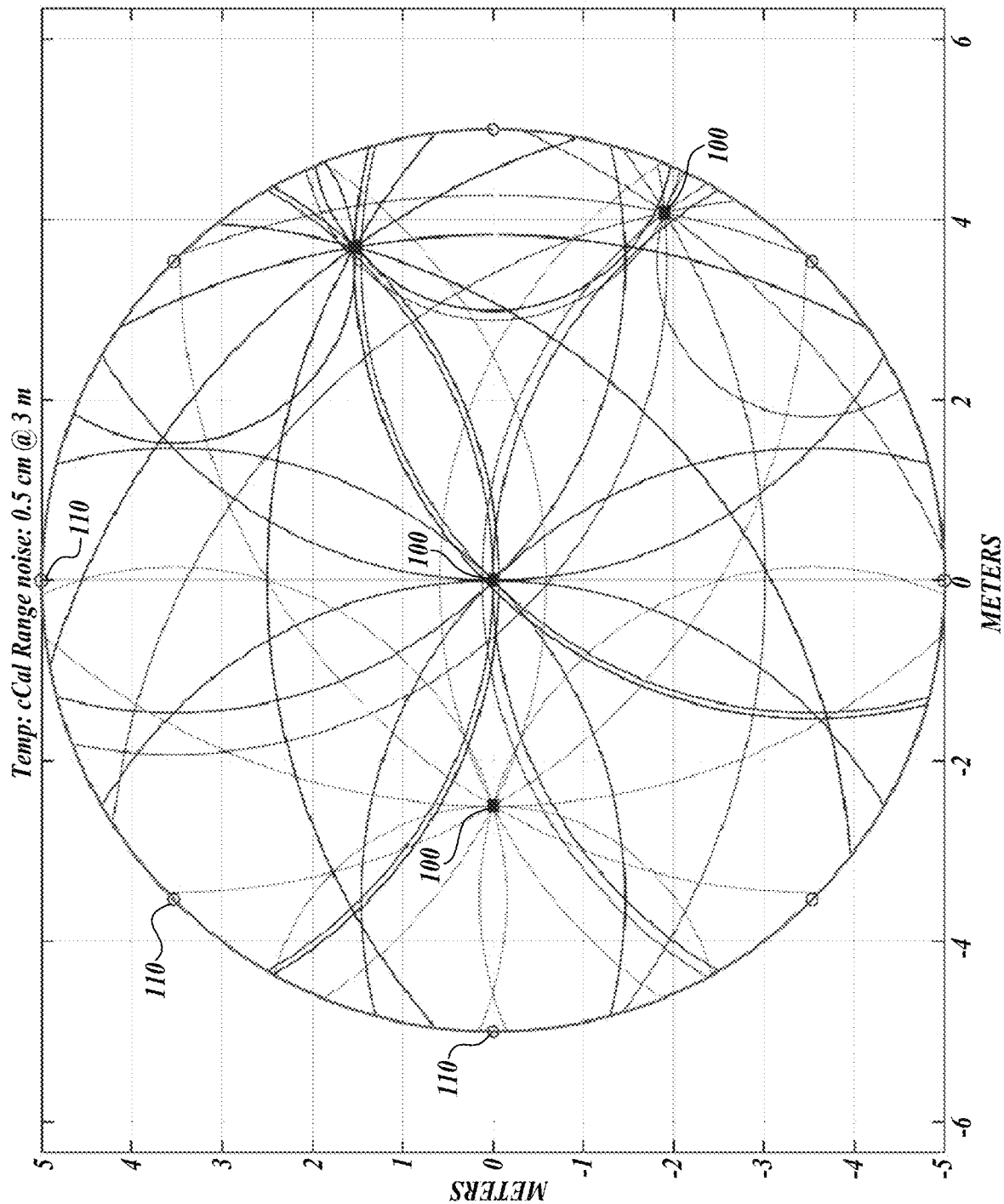
FIG. 18 shows range circles for eight hydrophones and four different vehicle positions at the calibration temperature of 20° C. according to an embodiment of inventive technology.
Figure 19:
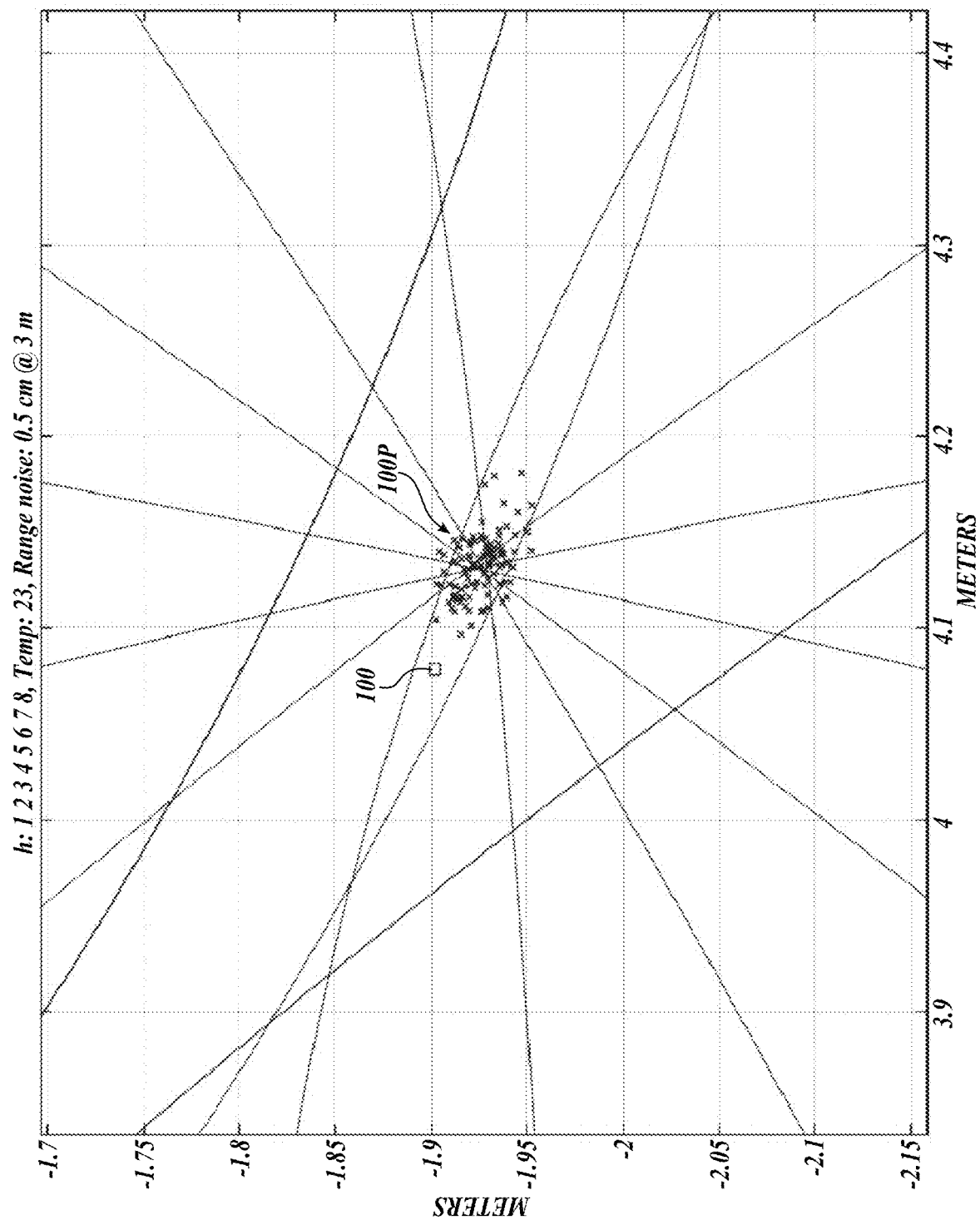
FIGS. 19 and 20 show zoomed-in range circles and estimate positions for the case shown in FIG. 18.

FIG. 19 is a zoomed-in view of vehicle location 4 (lower right in FIG. 18). The intersection point is the correct location (square) while the x's represent each random vehicle position measurement. Note that the grid spacing is 2 cm. This produces a spread of about 8 cm in position variation for 100 samples. The mean is relatively close to the correct location as expected. However, the range of possible errors, which may be understood as distances from the ROV 100 to any of the individually calculated positions 100P, is still significant for some applications.

Results differ for different simulations. For example, a second simulation was performed using 4 hydrophones for the same 4 vehicle positions shown in FIG. 18. However, liquid temperature was increased by 3° C. The vehicle positions are computed geometrically and then the times associated from each range value is computed using 20° C. as the base. The ranges are recomputed using a different temperature and then a minimization process is used to compute the least square range error to determine position. If there is a temperature error, the range circles will not long intersect at a single point. If the system has sufficient independent range errors, the least squares search process can also compute the speed of sound that minimizes the range error. This was demonstrated with the non-randomized range measurements.

Figure 20:
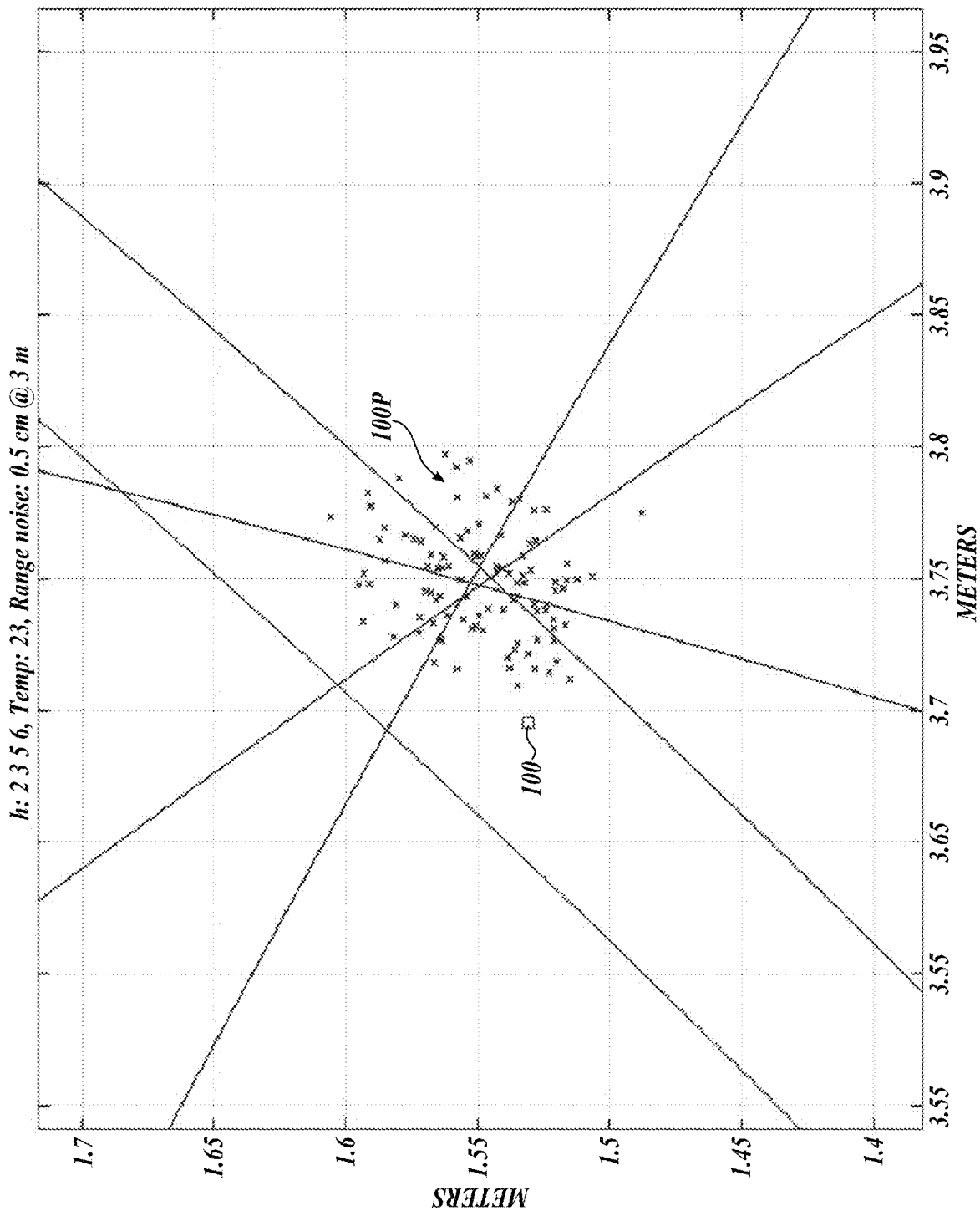

FIG. 20 provides such results at 23° C. Even at this zoomed out view and small tank, the lack of clear intersection of the range circles are obvious when compared to FIG. 19. Furthermore, liquid temperature below the calibration temperature of 20° C. would result in smaller range circles. The simulation shows the true (100) and measured (100P) positions of the vehicle.

TABLE 2

Statistics for 4 hydrophone [2 3 5 6] and 4 vehicles at 20° C. and 23° C.

| v | std_x | std_y | mean_x | mean_y | error_x | error_y |
|---|-------|-------|--------|--------|---------|---------|
| nTest: 100, Range error: 0.005 m @ 3.00 m Active Hydrophones: 2 3 5 6 Temp: 20 C. ||||||| 
| 1 | +0.013 | +0.008 | −0.000 | +0.000 | −0.000 | +0.000 |
| 2 | +0.020 | +0.006 | −2.498 | +0.000 | +0.002 | +0.000 |
| 3 | +0.022 | +0.023 | +3.696 | +1.530 | +0.000 | −0.001 |
| 4 | +0.021 | +0.025 | +4.080 | −1.903 | +0.001 | −0.002 |
| nTest: 100, Range error: 0.005 m @ 3.00 m Active Hydrophones: 2 3 5 6 Temp. 23 C. ||||||| 
| 1 | +0.013 | +0.008 | +0.041 | −0.001 | +0.041 | −0.001 |
| 2 | +0.022 | +0.007 | −2.532 | +0.001 | −0.032 | +0.001 |
| 3 | +0.020 | +0.024 | +3.749 | +1.549 | +0.054 | +0.018 |
| 4 | +0.021 | +0.031 | +4.129 | −1.922 | +0.051 | −0.020 |

A comparison Tables 1 and 2 indicates how the average position errors and scatter changes. FIG. 20 shows the zoomed view for vehicle 3 with 4 hydrophones.

Path Analysis

Straight Parallel Paths

Figure 22:
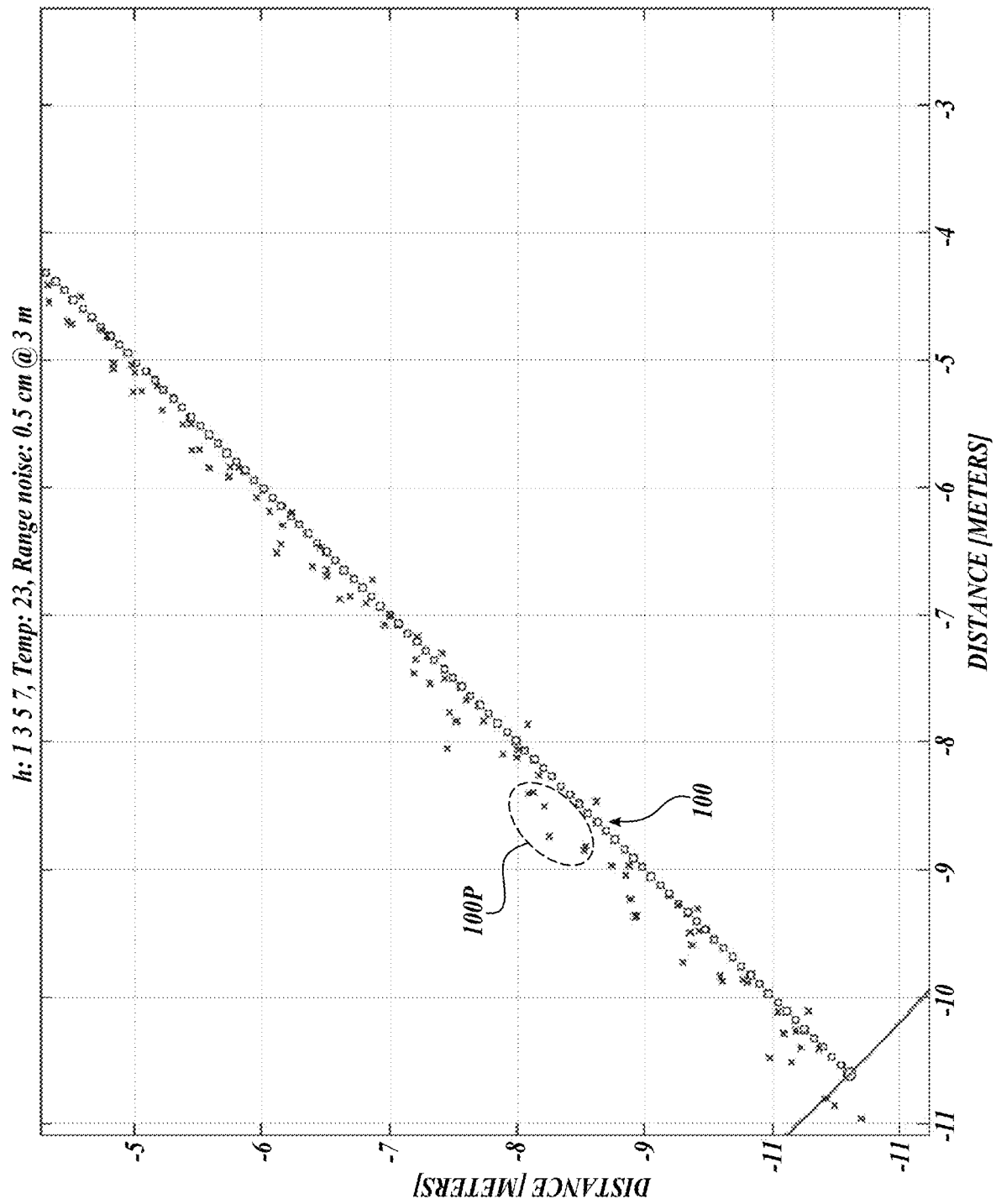
FIG. 22 shows a straight line simulation at 1 sample per second and ROV speed of 0.1 m/s (4 in/sec) with a temperature distribution shown in FIG. 21.

A version of the MATLAB simulation was developed to simulate straight line motion of the vehicle at a spacing based on the vehicle speed and APS update rate. The range variation and allowance for the 3° C. temperature change are included. The simulation illustrated in FIG. 22, shows the true (100) and measured (100P) positions as a vehicle moves vertically along the y axis. The largest difference in the error of the x position is 0.095 m and the largest y difference is 0.194 m.

In this simulation, the model was modified to allow a variation of temperature across the tank. The simulation then computed integrated change in sound velocity along the length of each vehicle to hydrophone path. This variation in the speed of sound was then included in the vehicle position analysis. To provide an initial estimate of how the temperature may vary across a tank, a steady state thermal solution to the scenario where 180 degrees of the tank wall is a 20°

Figure 21:
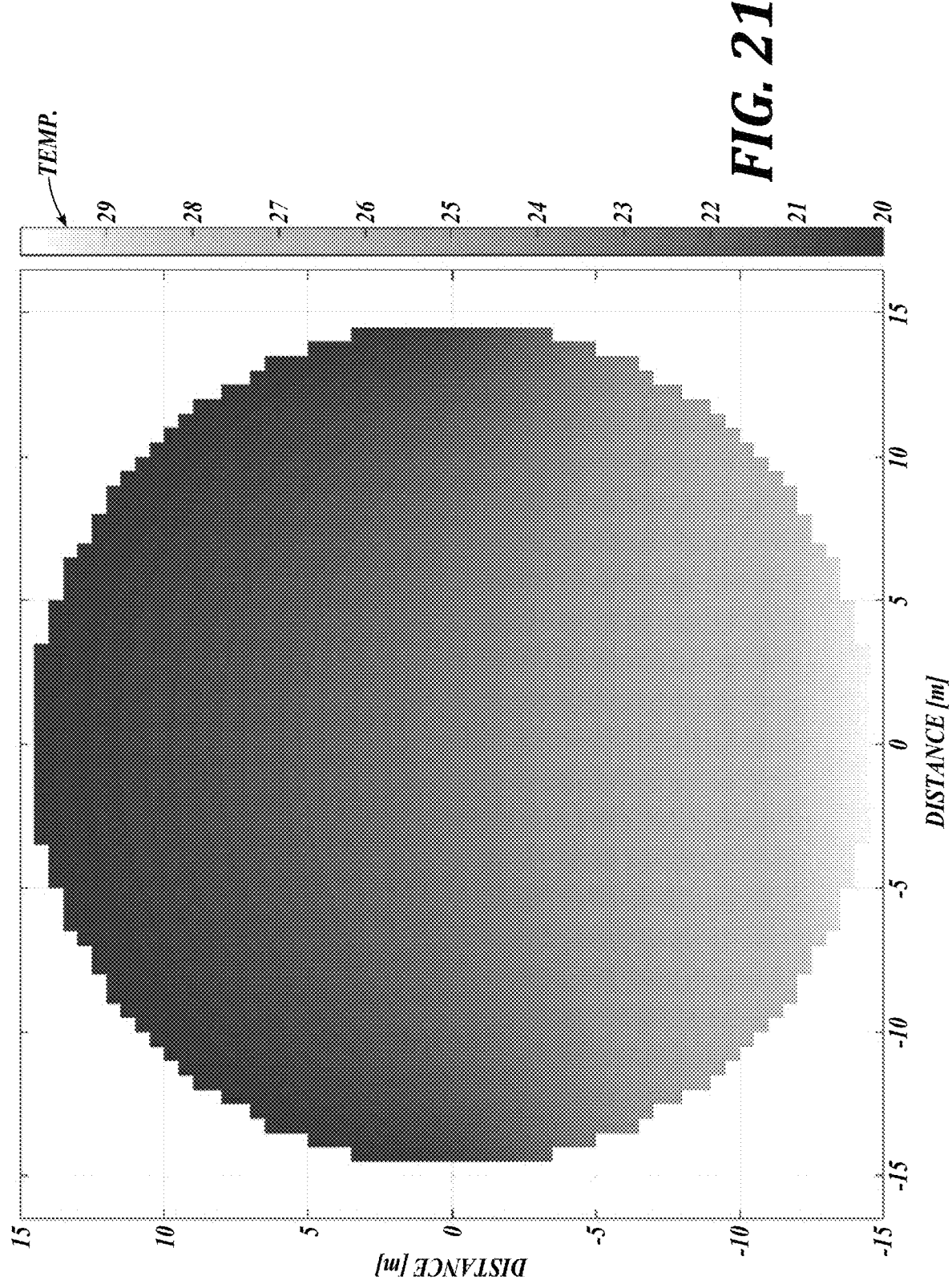
FIG. 21 shows temperature distribution in Centigrade across a 30-meter diameter tank used for analysis according to an embodiment of inventive technology.

C. and the opposing 180 degrees of the tank wall has a sinusoidal variation with a peak temperature of 30° C. The resulting temperature distribution in the tank is shown in FIG. 21.

FIG. 22 is the resulting simulation showing a vehicle path diagonally between two of the four hydrophones. The squares are the true position and the x's are the computed position resulting from both random range measurement errors based on a 0.3 cm standard deviation at 3 meters range (1000:1) and the errors due to the temperature distribution in the tank. FIG. 22 is a zoomed-in view.

MATLAB computed the measurement errors for each vehicle location under this scenario and the maximum error in x and y are each 0.82 meters. The position bias due to the temperature distribution is present in all three views. The bulk of the solutions are above the true positions.

There are several other error sources that cause the ROV position to be incorrect or jump as it moves. These include:

Incorrect speed of sound. This error occurs even with all 8 hydrophones in operation. Depending on the vehicle position in the tank, the minimization process finds different least squares solutions for the estimated position due to the variation in ranges. As the vehicle moves and hydrophones become obscured, the ROV position will likely abruptly shift. If there are sufficient hydrophone ranges available, solving for the speed of sound as part of the minimization process helps tighten the position estimates.

Different liquid temperatures within the tank. This situation causes the minimum position solution to shift, which is likely to be particularly true if the combination of hydrophones used for the solution changes as the vehicle moves due to shadowing of the path.

Incorrect positioning of the hydrophones and/or the tank shape is not circular. This effect would cause an absolute error in ROV estimated position and an apparent abrupt shift in position as the vehicle moves and hydrophones are obscured. The magnitude of the shift would of course be dependent the position error of the hydrophones, similar to a change in speed of sound along a path.

Motion. It doesn't seem that ROV velocity or differences in fluid velocity within the tank along each of the hydrophone ranges would be an issue. The difference in the velocity of sound between 20 and 23° C. is about 9 m/s, whereas vehicle velocity differential is less than 10% of that value.

Based on the 10 m diameter tank and a 3° C. error in the tank temperature using the ranging error statistics previously discussed, the positioning error may be 10 cm to 15 cm. The 10 cm error could potentially be larger for larger tanks, without taking into account position errors of the hydrophones. Therefore, in some embodiments, a ping-to-ping position estimates may be insufficient for short term vehicle navigation. On the other hand, laying down parallel inspection paths with respect to the tank floor rectangular plates would seem problematic, particularly if hydrophones go in and out of obscuration. Therefore, in some embodiment of the inventive technology, the system uses a low drift angle rate gyro for sensing ROV direction changes for local steering and for maintaining a constant direction or course. Also, because the APS position shifts significantly in two dimensions, an accurate encoder (e.g., a wheel encoder, a dual encoder, a doppler based velocity measurement like a doppler velocity log (DVL)) that is attached nearby to the ultrasound sensing array (UT) improves spacing of the UT samples in the data set. In some embodiments, the encoder can be installed on any place on the vehicle. Additionally, the edges of the floor plates can be used to adjust the scaling of the encoder data between adjacent floor scans.

In some embodiments, a 2D navigation on the tank bottom relies at least in part on:

APS for approximate ROV position, likely with 10 to 20 cm of scatter. Absolute positions and directions derived are a function of the liquid temperature variation within the tank and other items as discussed above. An ROV path tracked with the APS can be used to establish an approximate heading relative to the tank geometry/hydrophone locations. An alternative or additive approach is to use a sonar system mounted on the ROV and drop an acoustically reflective reference line from the manhole through which the ROV was deployed. This may be done at a known x-y location relative to the known ROV location. Measurement of the acoustic reflection within the sonar image allows the bearing of the ROV relative to the reflection reference to be determined continuously at the update rate of the sonar. The device may be passive or active. The use of retroreflectors distributed along the length of the reference line makes the reference line clearly visible in the sonar image from any place in the tank and improves visibility in larger tanks.

Dead-reckoning for data collection, encoders (near UT array and ROV) plus yaw gyro and repositioning between swaths. The data may be tagged with the APS information for later post processing and data spacing adjustment using the plate edges.

Use of the wheel encoders as part of the navigation solution for estimating velocity and position to reduce effects of variation in the APS navigation solution. This may also include adjusting solution sensitivities based on the geometry of the specific hydrophones and a noise model based on the range noise. A Kalman filter may be used for solution.

Because the encoders are located at a known position near to the UT array, they can be used to provide augment encoder information from the ROV. In some embodiments, a combination of UT encoders and the encoders on the ROV is used.

The ROV/IMU may need to be stopped (e.g., every few minutes) to establish revised biases for the IMU sensors.

Determining true north from the gyro readings using a gyrocompass. In some embodiments, the system can dwell at a single location and analyze the 3 rate gyros (or may be 2 gyros). The other options, besides using the APS motion to set a reference direction, are to park the ROV along know position on the wall or using the sonar from a known ROV position to a known feature in the tank.

Measurement of the tank wall temperature to estimate the internal distribution of temperature to aid in correcting for the speed of sound variations within the tank.

Direct measurement of the speed of sound as the ROV moves to difference portions of the tank. This may be done by either a device on the ROV or by moving the ROV to known locations within the tank and measuring acoustic time of flights between the ROV and hydrophones. This method may be used to post-correct the APS derived positions if necessary. Direct measurement of the speed of sounds as opposed to the temperature may eliminate the need to know the relationship between the temperature and the speed of sound for different liquids.

Concentric Arc Paths

Figure 23:
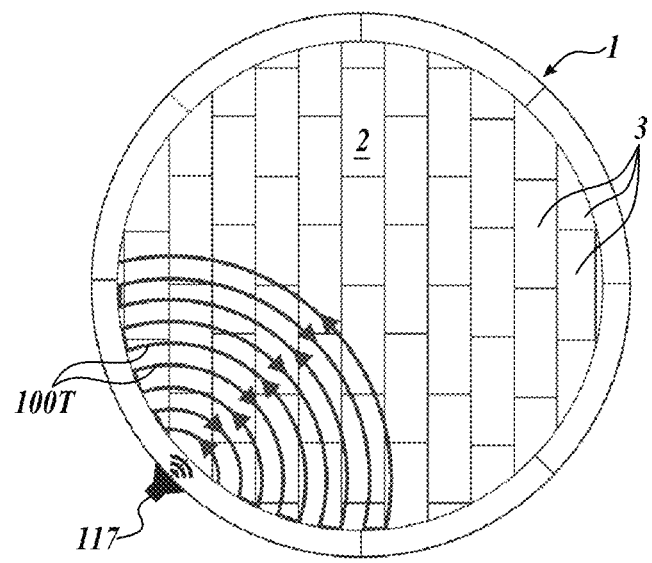
FIG. 23 illustrates arc scanning pattern at constant radius from a hydrophone according to an embodiment of inventive technology.

In some embodiments, data is collected along concentric arcs 100T of constant distance (acoustic range) from a specific hydrophone 117 instead of along straight lines (x, y), as shown in FIG. 23. In different embodiments, obstacles in the tank need to be evaluated to determine how the tank would be best covered (i.e., inspected) using hydrophone concentric arcs. Each arc radii may be offset by the width of the UT array plus some allowance for overlap based on the repeatability of the range information from a specific hydrophone.

Some advantages of the arc-path inspection are:

The ROV operates using only the range information from a single hydrophone. This may provide better feedback and the cross-track error is simply the range. Instead of using the rate gyro to provide a fixed heading angle, the rate gyro may be kept at a constant angle rate minus (or plus) the earth's rotation. Even though the hydrophone range value may only be updated once per second, the rate gyro and encoders may be able to provide more frequent radial estimates for either manual or automatic control. The navigation solution may be a combination of the IMU yaw rate gyro, encoder(s) and range data from a single hydrophone. Such an approach is simpler than trying to develop a robust Kalman filter solution that includes all hydrophones with the associated obscuration and diffraction created by obstacles in the tank.

Figure 24A:
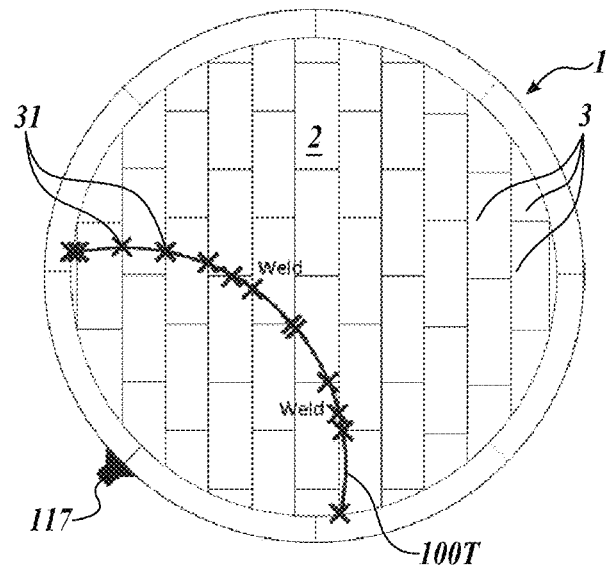
FIGS. 24A and 24B illustrate weld crossings along an arc shown in FIG. 23.
Figure 24B:
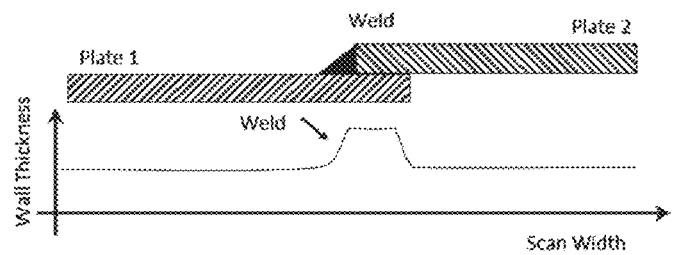

The UT or ROV encoders provide distance along the arc. Plate weld UT array crossings are more frequent as compared to x-y oriented scanning and can provide registration between the radial arcs as illustrated in FIG. 24A based on the detection of the welds as shown in FIG. 24B. The APS can still provide the estimated ROV position (x, y) along each arc.

Figure 25:
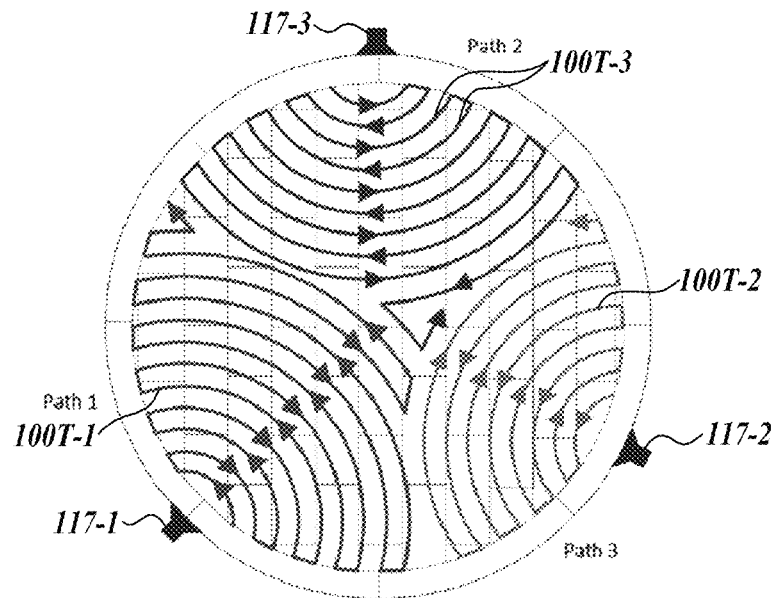
FIG. 25 illustrates a full tank floor inspection pattern using arcs at constant radius from hydrophones according to an embodiment of inventive technology.
Figure 26:
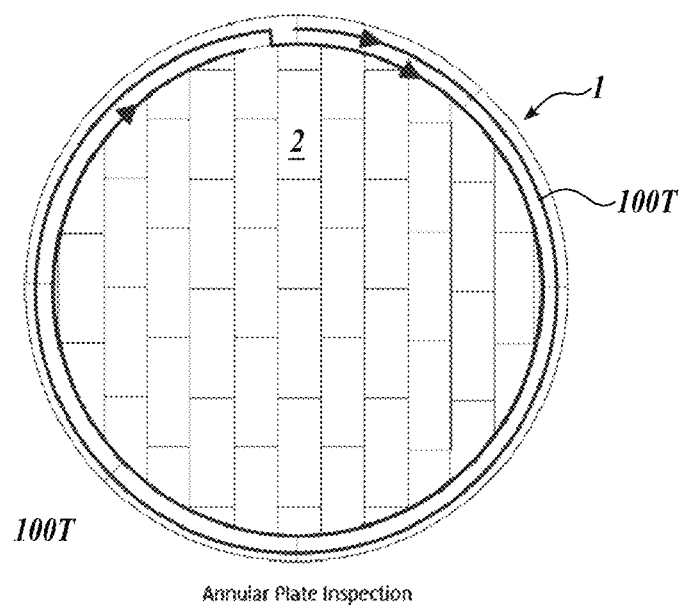
FIG. 26 illustrates an annular plate inspection pattern according to an embodiment of inventive technology.

Cross track error (i.e., radial error) becomes a function of a single range measurement and not a combination of measurements which otherwise dilute the accuracy depending on the ROV locations with respect to the hydrophones. The ROV position do not jump as hydrophones go in and out of view. The concentric arc paths tend to minimize the amount of required overlap between successive scans. FIG. 25 illustrates the scanning pattern of a completed inspection of a tank floor (full area coverage) using three hydrophones and three scanning sectors. The inspection path of the annular plate or area parallel to the tank shell/walls is shown in FIG. 26. The above are examples of possible paths, other examples are possible in different embodiments. Actual ROV paths or meander inspection routes may vary depending on tank diameter, obstacles inside the structure (sediments, debris, beams, columns, piping, heaters, etc.), and hydrophone position among others.

Errors in radial distance between the hydrophone and ROV are still a function of the liquid temperature variations, but only in the local area and are generally not affected by temperatures variation experienced by other hydrophone paths on other parts of the tank. Corrections to global position may be done by looking at overlapping coverage from other arc paths from different hydrophones.

Figure 27:
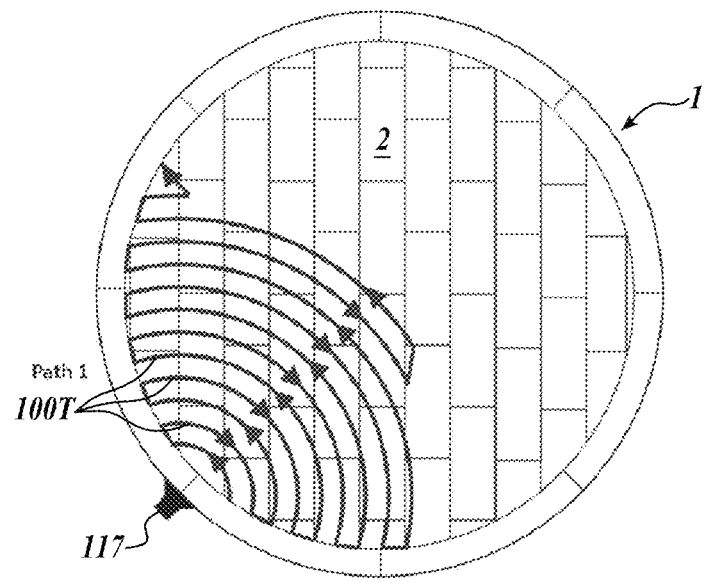
FIG. 27 illustrates an inspection of a sector along tank floor using one hydrophone and a pinger mounted on an ROV according to an embodiment of inventive technology.
Figure 28:
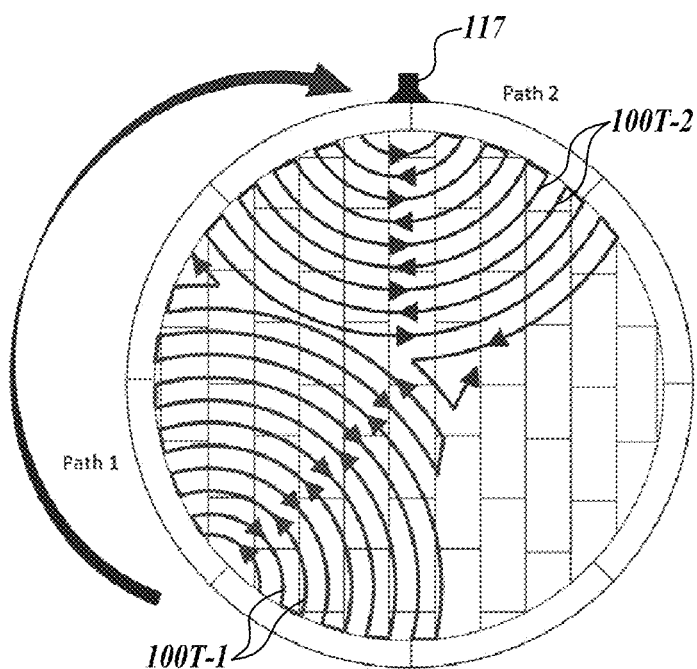
FIG. 28 illustrates an inspection of another sector using only one hydrophone and a pinger on the ROV according to an embodiment of inventive technology.

The system may potentially use a single hydrophone and transmitter to inspect segments of the tank and then move the externally attached hydrophone to a different segment. The ROV moves to that segment, find the hydrophone and start the motion on that new zone. This approach is illustrated in FIGS. 27 and 28. The data from the segment inspection may be stitched together during post processing. This method potentially eliminates the need for an array of transducers around the tank. The method also allows the transmitter to be in the tank or outside the tank as convenient potentially to eliminate spurious ultrasound wave mode generation in the tank wall.

For a given ROV speed and radius (i.e., distance to a given hydrophone), the angular turn rate ($\dot{\theta}$, yaw rate gyro) is equal to velocity/radius. For example, at a tight radius and higher speed for at r=2 m and v=0.2 m/s, $\dot{\theta}$=0.1 rad/s or 5.7°/sec. For r=5 m and v=0.1 m/s, $\dot{\theta}$=0.02 rad/s or 1.15°/sec. The question is how much do changes in velocity and changes in radius change the measured raw rate gyro. The following differential provides the relationship.

$$d\dot{\theta} = \frac{dv}{r} - \frac{v \cdot dr}{r^2}$$

Therefore, over the span of a 1 second, APS update rate at a radius of 5 m and an ROV speed of 0.1 m/s, if there is a 10% change in velocity (0.01 m/s) and a −3 cm change in radius, this will cause a change in $\dot{\theta}$ of 0.12°/sec. This is roughly 10% of the angular rate set point, and largely due to the change in velocity. So, if the ROV velocity is set to a constant value and the radius noise is reasonable, and if the operator or ROV focuses on keeping the yaw rate constant by steering while monitoring the radius error, the ROV may accurately track an arc.

Another measurement of turning may be the encoders that are mounted on each end of the UT array or on another location on the ROV (e.g., about 0.5 m apart). For example, for a 5 m turning radius, 0.1 m/s velocity and a 1 Hz APS rate, the distance travelled is 10 cm, thus the difference in encoder distances is 1 cm or 10%.

Local Reference for Heading

Figure 29:
FIG. 29 illustrates an acoustic retroreflector for a local heading reference according to an embodiment of inventive technology.

In some embodiments, the ROV position and orientation relies on the use of a local reference for heading to replace, for example, the magnetic north. In different embodiments, the heading reference can be passive or active. In one application for example, the ROV is introduced into the confined space or tank (indoors environment) via a manway. It moves, flights, swims, or navigates to the area of interest (e.g., specific position on the floor or side wall). The position of the ROV can be determined by reaching a feature with known coordinates (x, y, z) (e.g., valve, corner, pipe inlet/outlet, column, sensor, etc.). The position can also be calculated using a local positioning system based on acoustics (APS, sonar), optical (visual, infrared), electromagnetic, or another method. With the ROV away from the manway or entry point, a heading reference device is introduced into the tank or confined space (FIG. 29). In one of the embodiments, the heading reference or acoustic reference could be an acoustic retroreflector or corner reflector 115 with known coordinates (x, y, z). Once in place, the vehicle sonar 119 looks for the acoustic reference (e.g., acoustic retroreflector 115). The acoustic reference 115 produces a relatively bright and clear signal, in comparison with its surroundings, once it is illuminated with the sonar, as illustrated in FIG. 29.

Figure 30:
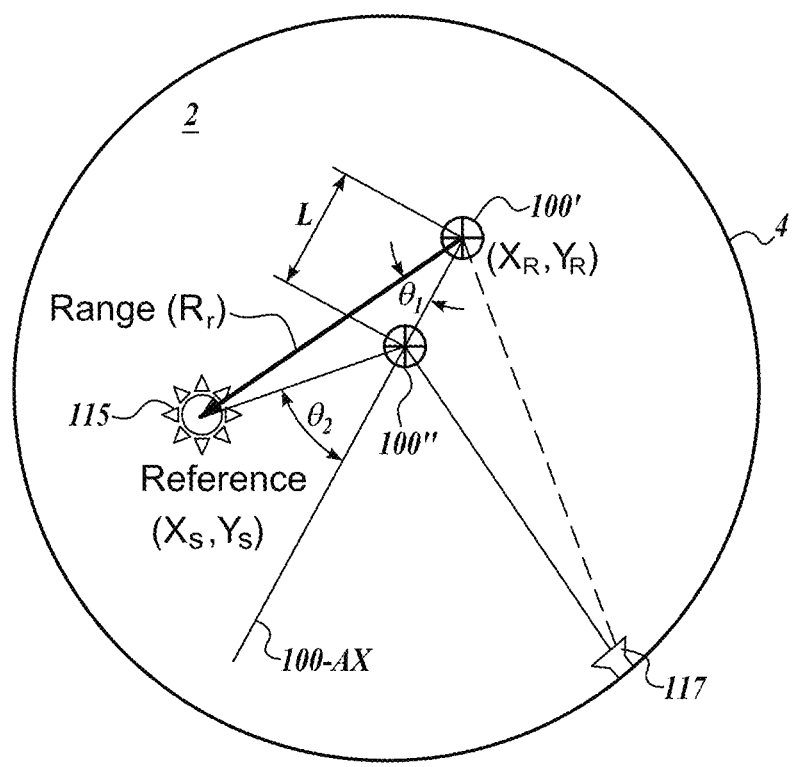
FIG. 30 illustrates a position for a heading reference and ROV on a tank floor according to an embodiment of inventive technology.

FIG. 30 illustrates a position for a heading reference and ROV on a tank floor 2 according to an embodiment of inventive technology. Based on the vehicle 100 orientation, the positioning system determines the angle $\theta_1$ between the ROV longitudinal axis 100-AX and the line between the vehicle and the acoustic reference (heading). Under this operating scenario, the ROV longitudinal axis 100-AX corresponds to a direction of movement of the ROV 100. The longitudinal axis 100-AX may be understood as related to the yaw angle of the ROV. In some embodiments, the accuracy of the heading reference is improved by a sonar signal received from the hydrophone 117. The vehicle 100 may travel along the longitudinal axis 100-AX from a location 100' to a location 100" and further, thus maintaining a relatively constant direction along 100-AX (also referred to as azimuth direction) by verifying that the changes in the angle θ (also referred to as azimuth angle or yaw angle) correspond to the calculated location of the ROV. For example, the vehicle (e.g., ROV) 100 may verify its location by determining that the angle $\theta_1$ became $\theta_2$ after a certain travel distance L.

Figure 31:
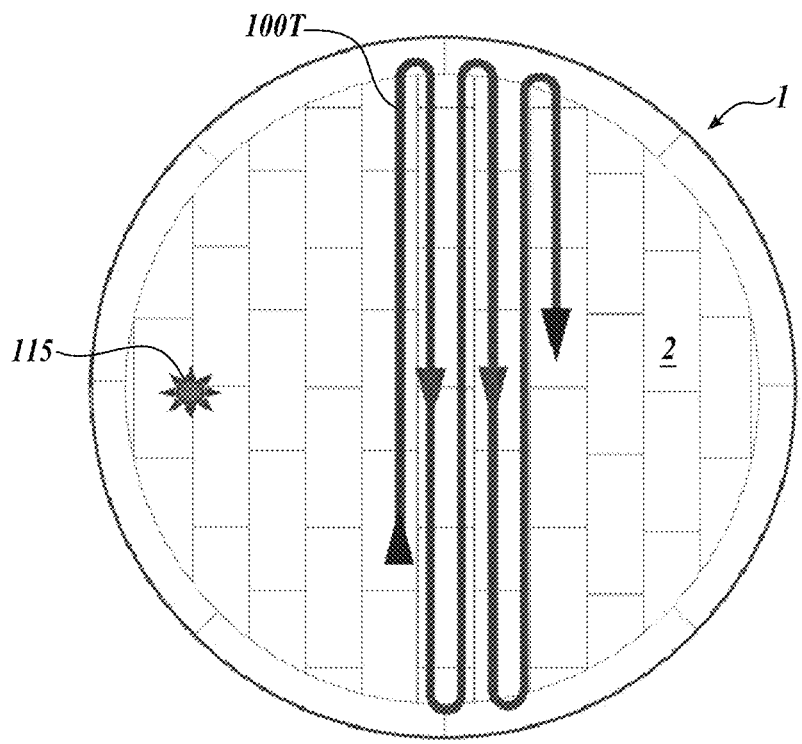
FIG. 31 illustrates an inspection meander pattern using parallel lines and a local heading reference according to an embodiment of inventive technology.

In an embodiment, the range data (i.e., distance between the ROV and the acoustic reflector 115 and/or hydrophone 117) can be used for positioning calculations. In the case of tank floors or bottoms (i.e., 2-D surfaces), the system may take into account the projection of these lines onto the working plane/tank floor (x, y) as, indicated in FIG. 30. In an embodiment, an inertial measurement unit (IMU) tracks the rate variation of θ (i.e., $\dot{\theta}$) for navigation and positioning calculations. Based on the local positioning system (i.e., acoustic, visual, etc.) and tracking approach used (i.e., radial, rectangular, other), different inspection paths or meanders are possible such as radial/polar, rectangular (FIG. 31), or a free path.

Figure 32:
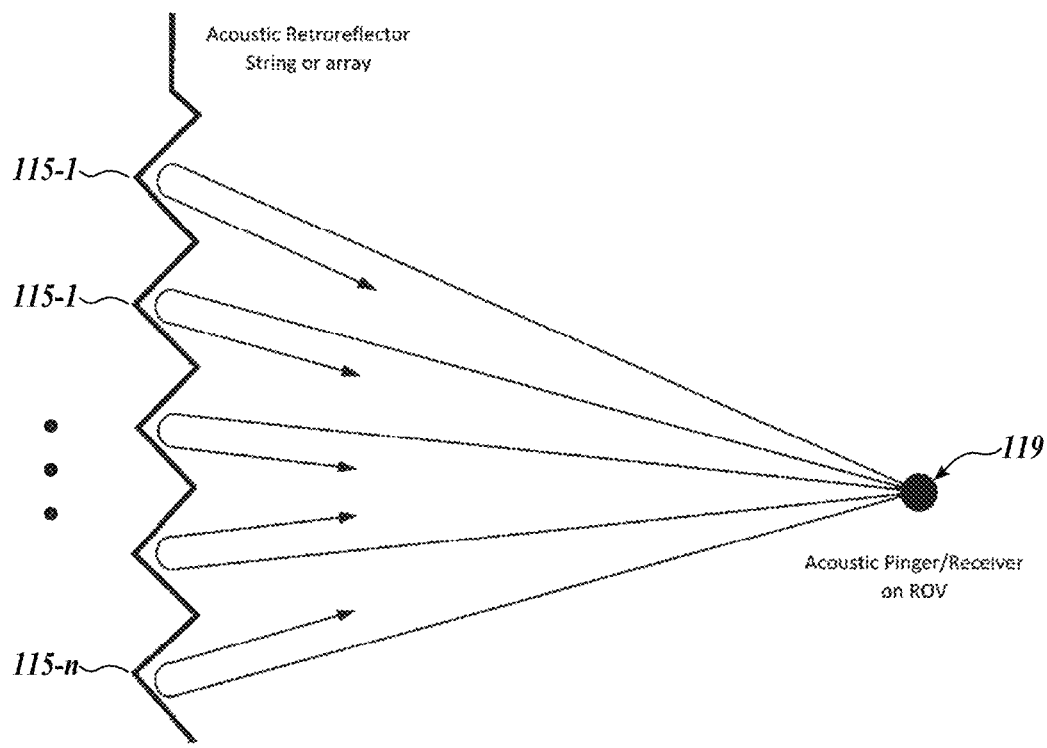
FIG. 32 is a side view of a linear array e.g., of acoustic retroreflectors or heading reference for an indoors ROV orientation according to an embodiment of inventive technology.
Figure 33B:
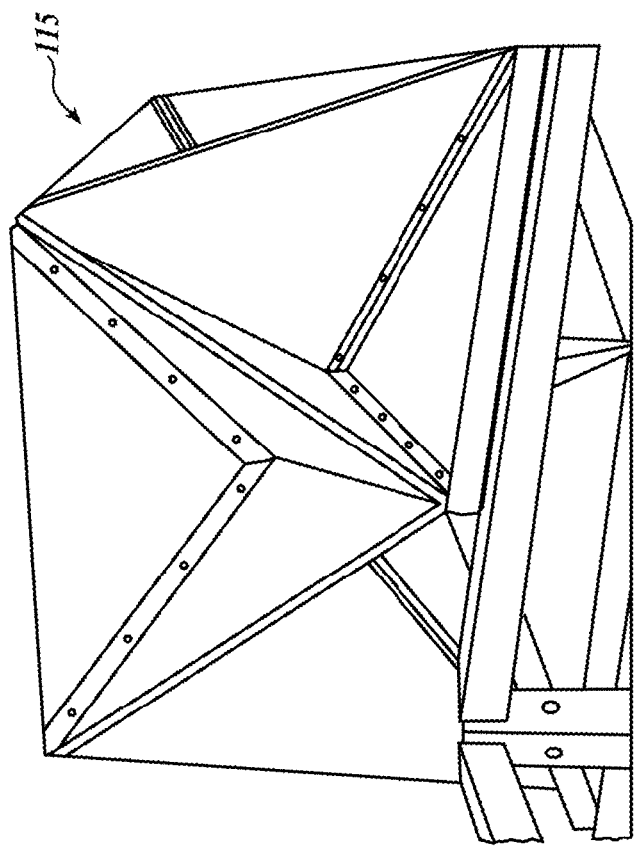
FIGS. 33A and 33B illustrate a trihedral acoustic retroreflector topology and device according to an embodiment of inventive technology.
Figure 33A:
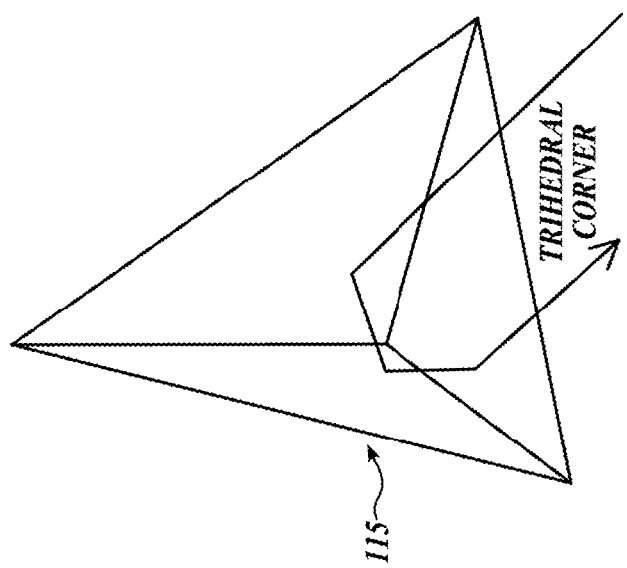
Figure 34B:
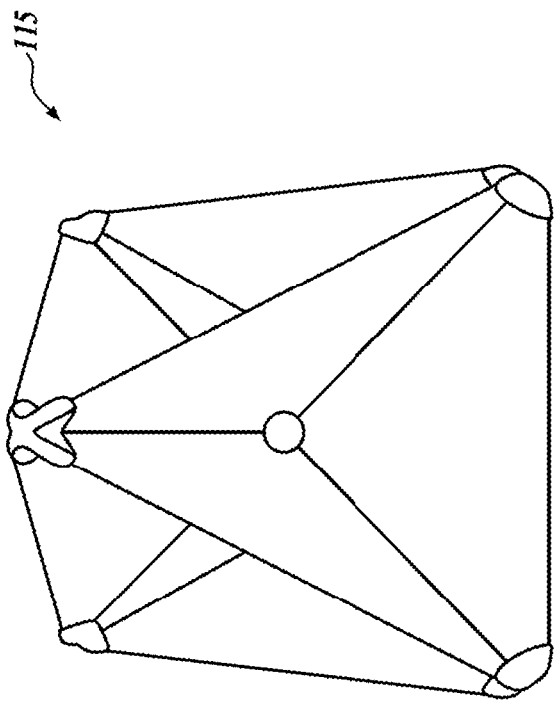
FIGS. 34A and 34B illustrate an octahedral retroreflector topology and device according to an embodiment of inventive technology.
Figure 34A:
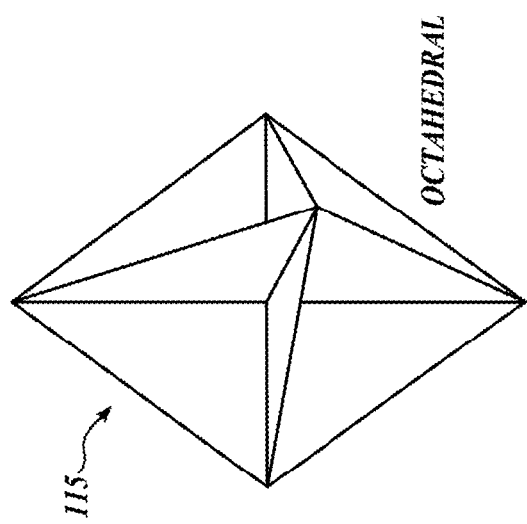
Figure 35A:
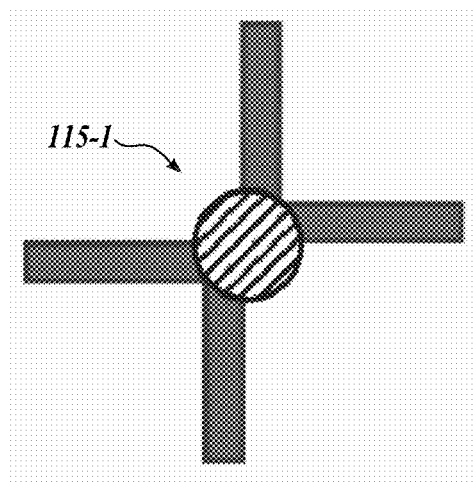
FIG. 35A-35D illustrate cross-sections for acoustic retroreflectors according to embodiments of inventive technology.
Figure 35B:
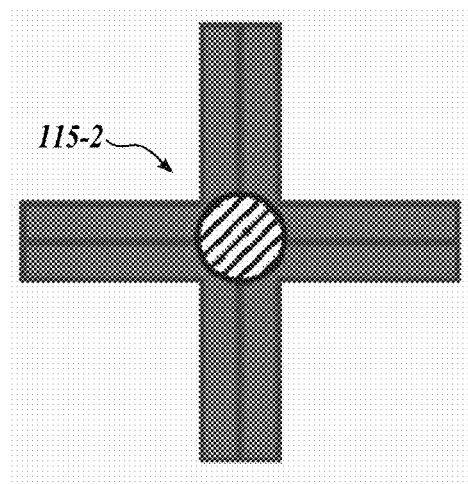
Figure 35C:
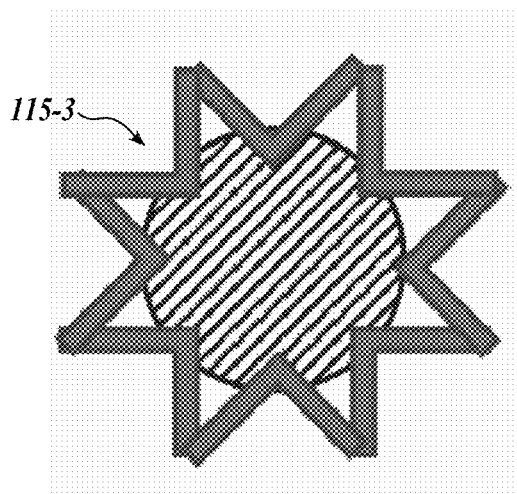
Figure 35D:
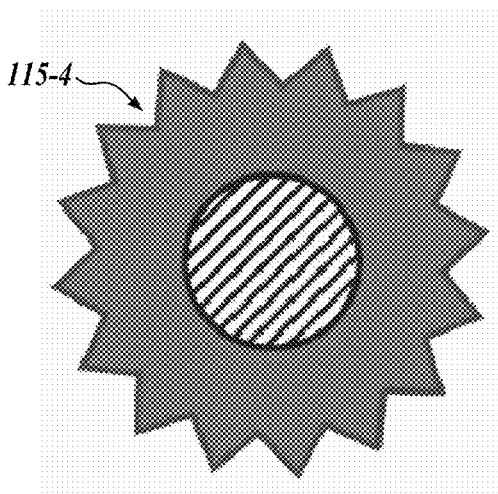
Figure 36A:
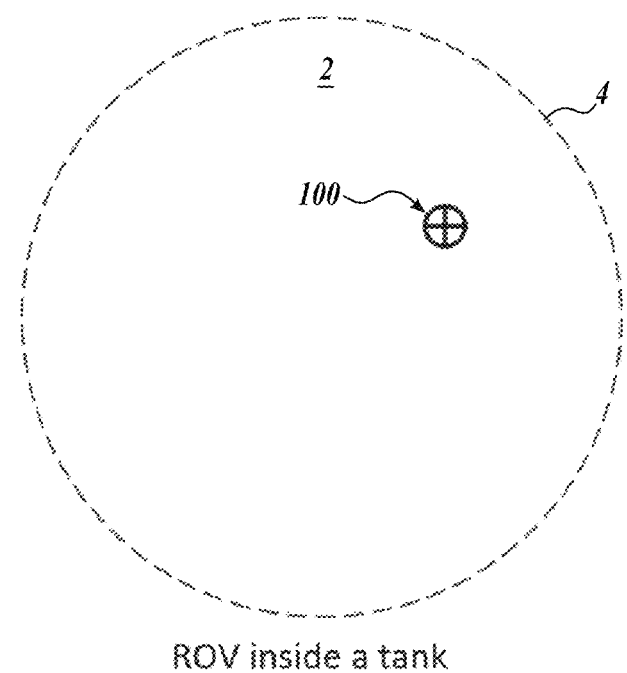
FIGS. 36A-36F illustrate determining ROV position based on sonar data and acoustic reference according to embodiments of inventive technology.
Figure 36B:
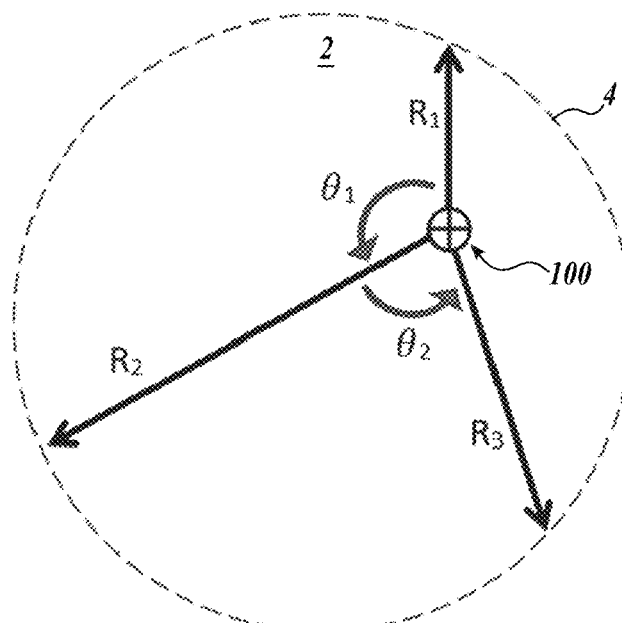
Figure 36C:
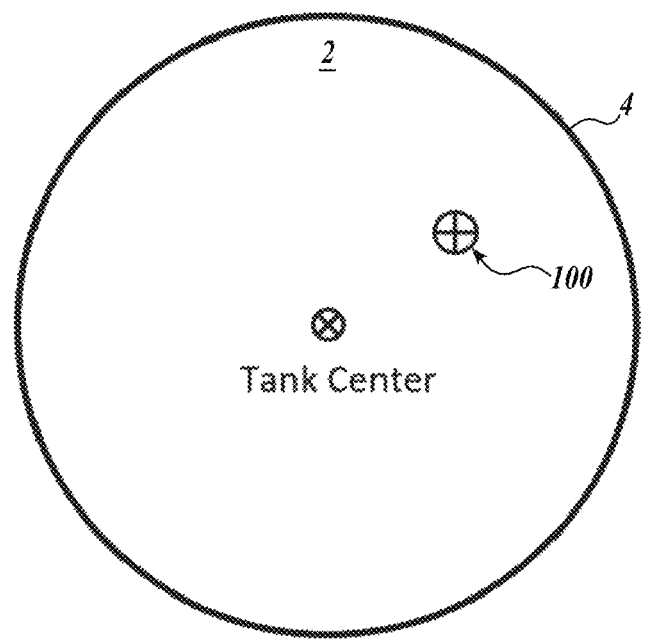
Figure 36D:
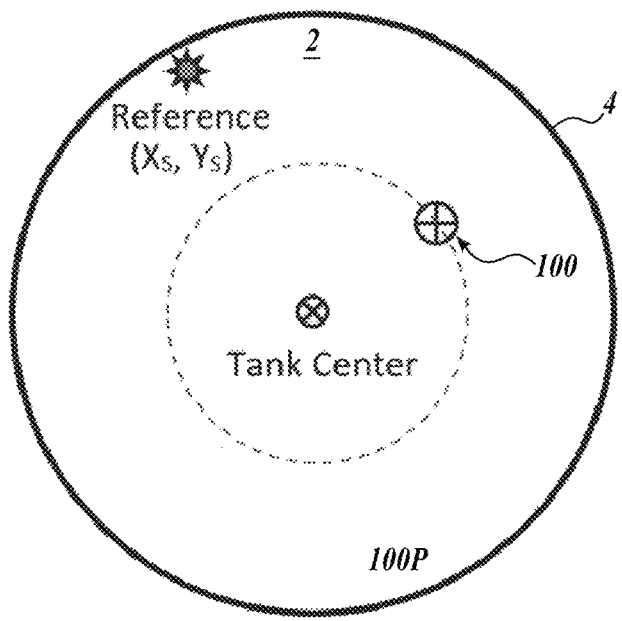
Figure 36E:
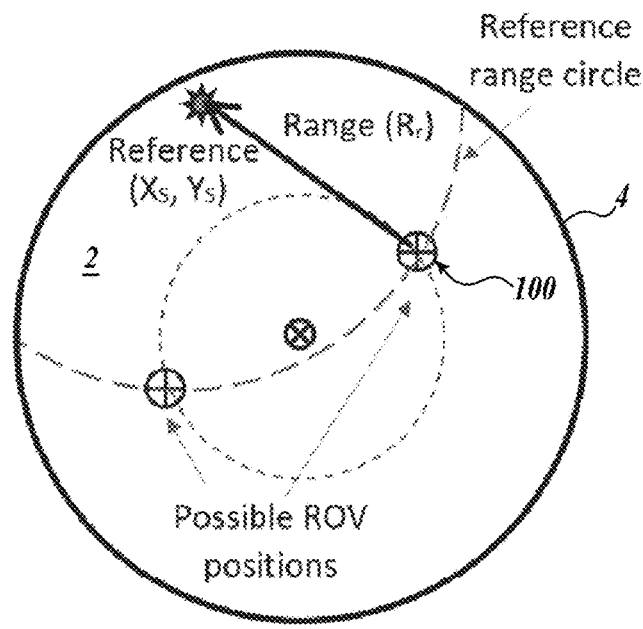
Figure 36F:
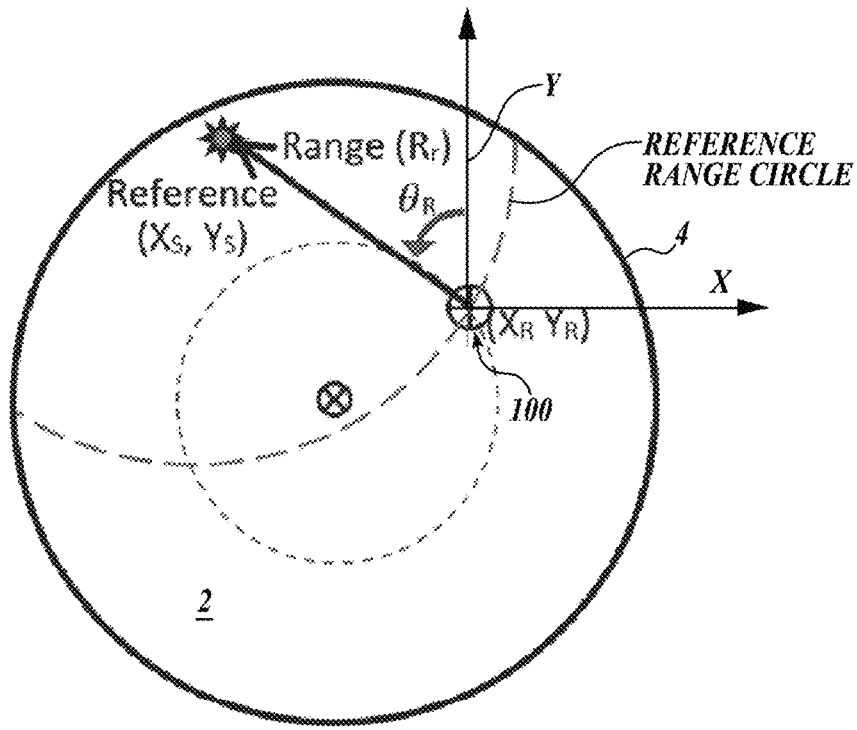

The acoustic reference may be passive, enhanced passive or active. Examples of passive references are vertical welds on the tank shells or horizontal welds on the tank floor. In an embodiment, an enhanced passive device may be an acoustic retroreflector or a corner reflector 115. The corner reflectors, such as trihedral corners, can be arranged in spiral patterns (along a curve or a straight line as illustrated in FIG. 32). Some corner reflectors 115 are illustrated in FIGS. 33A and 33B as acoustic retroreflectors having trihedral corners, and as acoustic retroreflectors having octahedral retroreflector topology illustrated in FIGS. 34A and 34B. Other patterns and topologies are possible, some examples are shown in FIG. 35A (an offset-cross topology), FIG. 35B (a cross topology), FIG. 35C (a star topology), and FIG. 35D (a star topology). The length or sides of these shapes are generally equal or larger than the wavelength of the incoming acoustic signal. In one embodiment, the acoustic reflectors can be made with materials or a set of materials (composites or meta-materials) with highly reflective acoustic responses. In one embodiment, active acoustic reference signal can be another acoustic signal (i.e., beacon) or the reference can be provided by an optical, magnetic, or other mechanism.

In different embodiments shown in FIGS. 36A-36F, methods for determining the ROV position and orientation include the use of sonar range data and at least one pinger/hydrophone data. In some embodiment, the ROV uses sonar range data and at least one acoustic reference to determine its position and orientation inside the indoor space. In particular, based on the known circular tank geometry and dimensions, sonar data (ranges and angles) from the ROV are used to compute and fit a circle inside the tank resulting on an estimated tank center (i.e., fitted circle center). The local position of the ROV and the circle center produces a circle with possible ROV positions. This circle is placed around the tank center. To find the actual ROV position, a local reference heading inside the tank is needed. This local reference has well known coordinates (Xs, Ys). Next, the ROV detects the local reference using sonar or other technology (image from a camera for example). The sonar range data and the orientation angle respect to the ROV longitudinal are used to compute a second circle that intersects with the circle with potential ROV positions described previously. These circles intersect at two possible ROV positions. Using the ROV sonar and the angle between the ROV longitudinal axes and the local reference, a unique ROV position inside the tank is found.

In some embodiments, the ROV uses sonar range data, at least one pinger/hydrophone, and at least one acoustic reference to determine its position and orientation.

In one embodiment, the ROV uses a pinger and hydrophone to perform a scan on sector of the tank. Next, the hydrophone is moved into a new position or sector. Then, the ROV perform an arc scan approach for example for that sector. Once finished, the hydrophone is moved into a new position to perform a subsequent scanner successively until all tank or region of interest has been scanned or inspected.

In one embodiment, at least one pinger is mounted on the ROV and at least on hydrophone is located on the shell/wall of the tank. In another embodiment, at least one pinger is mounted on the tank wall and at least one hydrophone is installed on the ROV. The system can also be combined with sonar range data. The system can also be combined with an acoustic reference signal.

Figure 37:
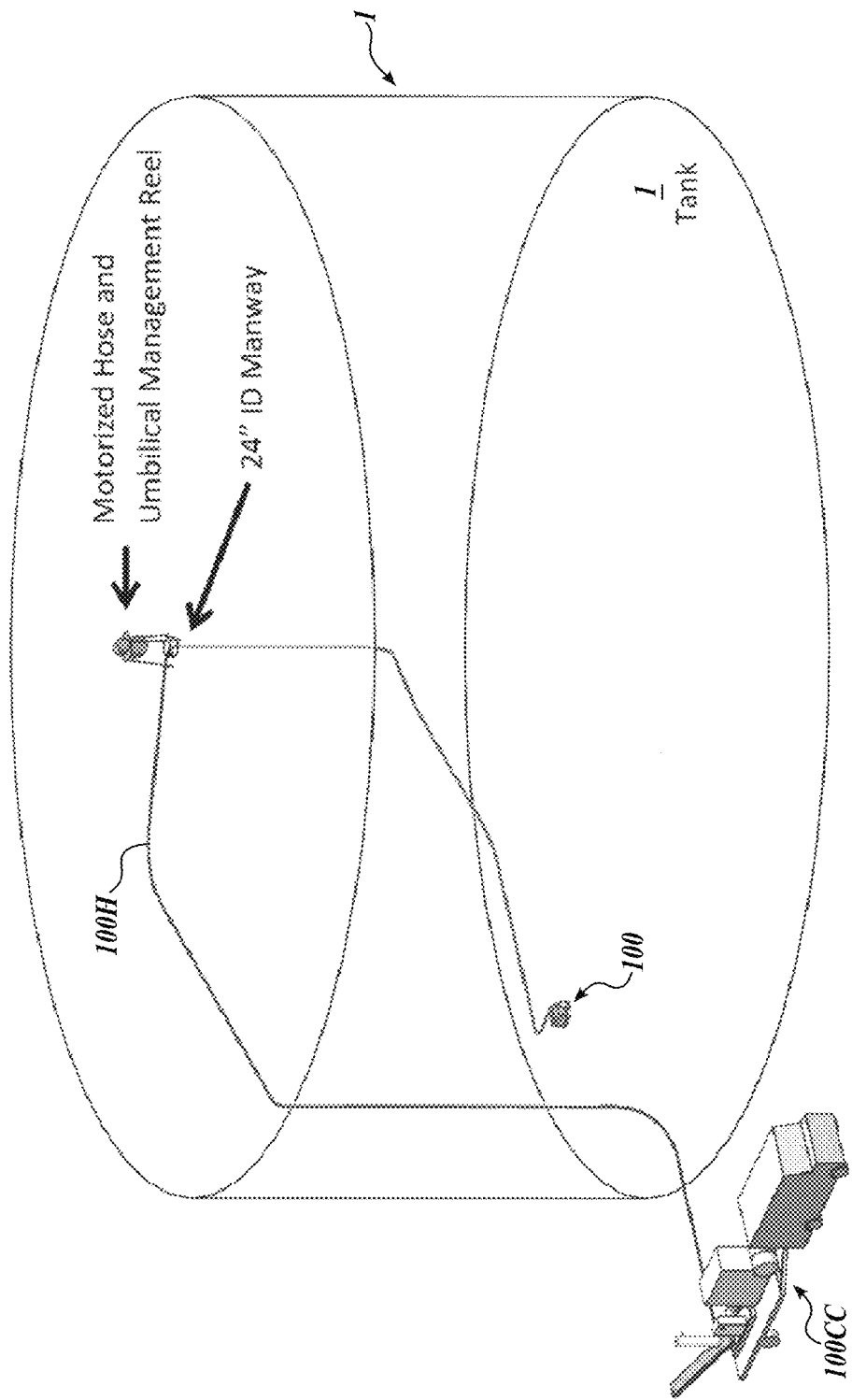
FIG. 37 illustrates cleaning ROV system for tanks according to an embodiment of inventive technology.

The navigation system methods described on this invention can be used not only to inspect indoor structures but also to clean them using brushes, high-pressure jets and plows among other devices (FIG. 37), create internal maps, transport goods, transport information, perform any type of work such as painting, scraping, welding, and sensing among others. The illustrated inspection vehicle 100 may be connected to a vehicle control center 100CC through a cable/hose management system 100H.

Many embodiments of the technology described above may take the form of computer- or controller-executable instructions, including routines executed by a programmable computer or controller. Those skilled in the relevant art will appreciate that the technology can be practiced on computer/controller systems other than those shown and described above. The technology can be embodied in a special-purpose computer, controller or data processor that is specifically programmed, configured or constructed to perform one or more of the computer-executable instructions described above. Accordingly, the terms "computer" and "controller" as generally used herein refer to any data processor and can include Internet appliances and hand-held devices (including palm-top computers, wearable computers, cellular or mobile phones, multi-processor systems, processor-based or programmable consumer electronics, network computers, mini computers and the like).

From the foregoing, it will be appreciated that specific embodiments of the technology have been described herein for purposes of illustration, but that various modifications may be made without deviating from the disclosure. Moreover, while various advantages and features associated with certain embodiments have been described above in the context of those embodiments, other embodiments may also exhibit such advantages and/or features, and not all embodiments need necessarily exhibit such advantages and/or features to fall within the scope of the technology. Accordingly, the disclosure can encompass other embodiments not expressly shown or described herein.

The invention claimed is:

1. A system for inspecting or maintaining a storage tank, comprising:
    a vehicle comprising:

at least one sensor for determining properties of a storage tank;
a navigation system comprising:
an acoustic transmitter (TX) carried by the vehicle, and a propulsion unit configured to move the vehicle within the storage tank; and
an acoustic receiver (RX) fixed with respect to the storage tank, wherein the vehicle moves inside the storage tank in concentric arcs with respect to the acoustic receiver (RX) being a center point of the concentric arcs.

2. The system of claim 1, wherein the TX is an acoustic pinger, and the RX is a hydrophone.

3. The system of claim 1, wherein the RX is a bright acoustic reflector inside the storage tank.

4. The system of claim 3, wherein the bright acoustic reflector inside the storage tank is an acoustic retroreflector string or a corner acoustic reflector.

5. The system of claim 4, wherein a shape of the bright acoustic reflector is selected from a group consisting of a trihedral topology, an octahedral topology, a star topology, a cross topology and an offset-cross topology.

6. The system of claim 1, further comprising a second RX fixed with respect to the storage tank, wherein the vehicle at least partially moves inside the storage tank in another set of concentric arcs with respect to the second RX.

7. The system of claim 1, wherein the at least one sensor for determining properties of the storage tank is configured to determine thickness of a tank wall or a tank floor.

8. The system of claim 7, wherein the at least one sensor for determining properties of the storage tank is an ultrasound sensor or an electromagnetic sensor.

9. The system of claim 1, wherein the vehicle is a remotely operated vehicle (ROV) or an autonomously operated vehicle.

10. The system of claim 9, wherein the navigation system of the ROV further comprises a sensor selected from a group consisting of: a hydrostatic pressure sensor configured for depth measurements, and an optical ranging system.

11. The system of claim 10, wherein the optical ranging system is a lidar.

12. A method for inspecting or maintaining a storage tank, comprising:
positioning a vehicle at a first location inside the storage tank by a propulsion unit of the vehicle, the vehicle comprising at least one acoustic receiver (RX), at least one acoustic transmitter (TX), at least one inertial measurement unit (IMU);
emitting, by the at least one TX of the vehicle, a first acoustic signal toward an acoustic hydrophone attached to the storage tank in a first location;
determining a distance from the at least one TX of the vehicle to the acoustic hydrophone attached to the storage tank;
emitting, by the at least one TX of the vehicle, a second acoustic signal toward a bright acoustic reflector attached to the storage tank in a second location;
receiving, by the at least one RX of the vehicle, a second reflected acoustic signal from the bright acoustic reflector;
determining a first azimuth angle of the vehicle with respect to a longitudinal axis of the vehicle and a first distance from the bright acoustic reflector;
moving the vehicle in a direction of an azimuth direction to a second location of the vehicle inside the storage tank; and
determining a second azimuth angle of the vehicle at the second location with respect to a second distance from the acoustic hydrophone and a second distance from the bright acoustic reflector.

13. The method of claim 12, further comprising moving the vehicle to a third location along a straight line through the first location and the second location.

14. The method of claim 12, further comprising sensing a property of the storage tank at the first location by at least one sensor of the vehicle.

15. The method of claim 12, wherein the vehicle is a remotely operated vehicle (ROV) or an autonomously operated vehicle.

16. The method of claim 15, wherein the RX, the TX, and the IMU of the vehicle are elements of a navigation system of the ROV, the navigation system further comprising at least one sensor selected from a group consisting of: a hydrostatic pressure sensor configured for depth measurements, and an optical ranging system.

17. The method of claim 12, further comprising verifying that the second azimuth angle corresponds to the second location of the vehicle as determined based on the at least one IMU and at least one encoder.

18. The method of claim 12, further comprising determining the second location of the vehicle based on the at least one IMU and at least one encoder.

19. A method for inspecting or maintaining a storage tank, comprising:
traversing a vehicle inside the storage tank;
determining properties of a storage tank by at least one sensor of the vehicle;
navigating the vehicle by a navigation system comprising:
an acoustic transmitter (TX) carried by the vehicle, an inertial measurement unit (IMU) sensor configured to at least partially determine a location of the vehicle with respect to the storage tank, and a propulsion unit configured to move the vehicle within the storage tank; and
sending acoustic signal by the TX carried by the vehicle to an acoustic receiver (RX) fixed with respect to the storage tank, wherein the vehicle moves inside the storage tank in concentric arcs with respect to the RX fixed with respect to the storage tank, wherein the RX is a center point of the concentric arcs.

20. The method of claim 19, further comprising sending acoustic signal by the TX carried by the vehicle to a second RX fixed with respect to the storage tank, wherein the vehicle at least partially moves inside the storage tank in another set of concentric arcs with respect to the second RX.

21. The method of claim 19, wherein the TX is an acoustic pinger, and the RX is a hydrophone.

22. The method of claim 19, wherein the RX is a bright acoustic reflector inside the storage tank.

23. The method of claim 19, wherein the bright acoustic reflector inside the storage tank is an acoustic retroreflector string or a corner acoustic reflector.

24. A system for inspecting or maintaining a storage tank, comprising:
a vehicle comprising:
a propulsion unit configured to move the vehicle within the storage tank;
at least one sensor for determining properties of the storage tank;
at least one inertial measurement unit (IMU) sensor configured to at least partially determine a location of the vehicle with respect to the storage tank;

at least one acoustic transmitter (TX) carried by the vehicle; and
at least acoustic receiver (RX) carried by the vehicle;
an acoustic hydrophone attached to the storage tank in a first location; and
a bright acoustic reflector attached to the storage tank in a second location, wherein the system comprises a non-transitory computer-readable medium having computer-executable instructions stored thereon that, in response to execution by one or more processors of a computing device, cause the computing device to perform actions comprising:
positioning the vehicle at a first location inside the storage tank by the propulsion unit of the vehicle, the vehicle comprising at least one inertial measurement unit (IMU);
emitting by the at least one TX of the vehicle, a first acoustic signal toward an acoustic hydrophone attached to the storage tank in a first location;
determining a distance from the at least one TX of the vehicle to the acoustic hydrophone attached to the storage tank;
emitting, by the at least one TX of the vehicle, a second acoustic signal toward a bright acoustic reflector attached to the storage tank in a second location;
receiving, by the at least one RX of the vehicle, a second reflected acoustic signal from the bright acoustic reflector;
determining a first azimuth angle of the vehicle with respect to a longitudinal axis of the vehicle and a first distance from the bright acoustic reflector;
moving the vehicle in a direction of an azimuth direction to a second location of the vehicle inside the storage tank; and
determining a second azimuth angle of the vehicle at the second location with respect to a second distance from the acoustic hydrophone and a second distance from the bright acoustic reflector.

25. The system of claim 24, wherein the computer-executable instructions further cause the computing device to perform actions comprising moving the vehicle to a third location along a straight line through the first location and the second location.

26. The system of claim 24, wherein the computer-executable instructions further cause the computing device to perform actions comprising sensing a property of the storage tank at the first location by at least one sensor of the vehicle.

27. The system of claim 24, wherein the vehicle is a remotely operated vehicle (ROV) or an autonomously operated vehicle.

28. The system of claim 24, wherein the RX, the TX, the IMU and at least one encoder of the vehicle are elements of a navigation system of the ROV, the navigation system further comprising at least one sensor selected from a group consisting of: a hydrostatic pressure sensor configured for depth measurements, and an optical ranging system.

29. The system of claim 24, wherein the computer-executable instructions further cause the computing device to perform actions comprising further comprising:
verifying that the second azimuth angle corresponds to the second location of the vehicle as determined based on the at least one IMU and at least one encoder.

30. The system of claim 24, further comprising determining the second location of the vehicle based on the at least one IMU and at least one encoder.

* * * * *